United States Patent
Nakatsuka et al.

(10) Patent No.: US 6,657,653 B2
(45) Date of Patent: Dec. 2, 2003

(54) ELECTRIC PHOTOGRAPH SYSTEM

(75) Inventors: Shinichi Nakatsuka, Hino (JP); Junshin Sakamoto, Mito (JP); Akira Arimoto, Fuchu (JP)

(73) Assignees: Hitachi, Ltd., Tokyo (JP); Hitachi Printing Solutions, Ltd., Kanagawa-ken (JP)

( * ) Notice: Subject to any disclaimer, the term of this patent is extended or adjusted under 35 U.S.C. 154(b) by 0 days.

(21) Appl. No.: 09/883,185

(22) Filed: Jun. 19, 2001

(65) Prior Publication Data

US 2002/0024586 A1 Feb. 28, 2002

(30) Foreign Application Priority Data

Jun. 21, 2000 (JP) ........................ 2000-185707

(51) Int. Cl.⁷ ................................................ B41J 2/435
(52) U.S. Cl. ....................................................... 347/246
(58) Field of Search ............................... 347/246, 241, 347/258, 236; 372/43, 45, 46

(56) References Cited

U.S. PATENT DOCUMENTS

| 4,814,791 A | * | 3/1989 | Ohara et al. ............... 347/253 |
| 5,751,756 A | * | 5/1998 | Takayama et al. ........... 372/46 |
| 5,809,053 A | * | 9/1998 | Nakasuka et al. ........... 372/46 |

FOREIGN PATENT DOCUMENTS

| JP | 62-65391 | 9/1985 |
| JP | 62-179193 | 1/1986 |
| JP | 3-269456 | 3/1990 |
| JP | 9-74251 | 7/1996 |

OTHER PUBLICATIONS

Gary L. Holland, "A Resolution Enhancement Technique for Electrophotographic Printers," SID 90 Digest, pp. 278–279, 1990.

Naoki Chinonem, Takao Kuroda, Tsukuru Ohtoshi, Takeo Takahashi and Takashi Kajimura, "Mode–Hopping Noise in Index–Guided Semiconductor Lasers and Its Reduction by Saturable Absorbers," IEEE Journal of Quantum Electronics, Vol QE–21, No. 8, Aug. 1985, pp. 1264–1270.

* cited by examiner

Primary Examiner—Michael Nghiem

(57) ABSTRACT

An electric photograph system for improving non-linearities of an exposing light intensity and an operating current at a low exposing level when performing analog printing operation. A range (saturable absorber) having a saturable absorbing characteristic is provided in a part of an optical path including a semiconductor laser as light source to improve the non-linearity of the operating current when the light intensity is weak. The saturable absorber may be made in the form of a non current injected area provided in a part of the semiconductor laser as the light source or a thin film layer provided partly in films coated on a facet of the semiconductor laser. Due to the provision of the saturable absorber, the light output power characteristic can exhibit its linearity in its low optical power range, the size of a printing dot can be arithmetically changed, and thus fine laser printing can be realized.

22 Claims, 13 Drawing Sheets

Prior Art
FIG.22
(a)
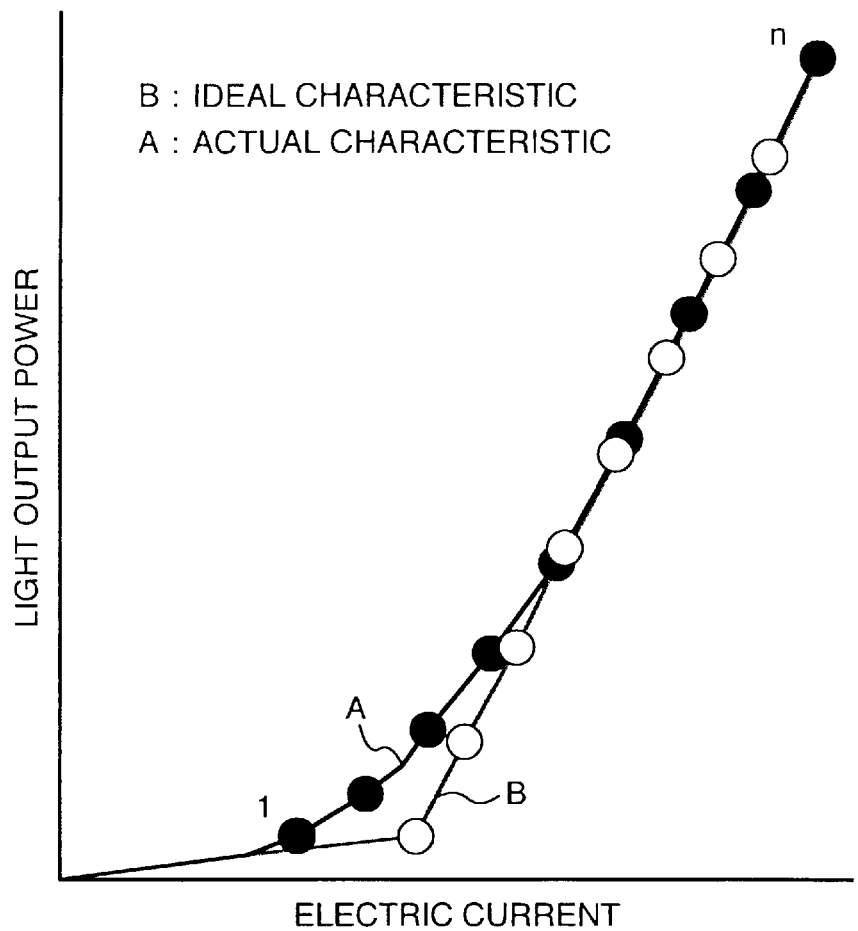
(b)
PRINTING DOT
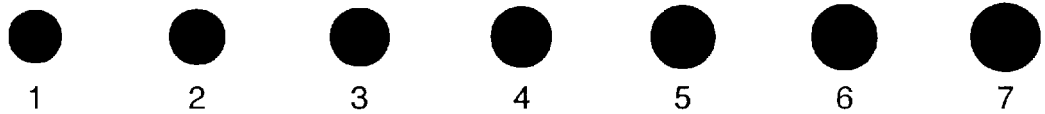
1  2  3  4  5  6  7

ELECTRIC PHOTOGRAPH SYSTEM

BACKGROUND OF THE INVENTION

The present invention relates to an electric photograph system for performing analog printing and more particularly, to a technique for use in a laser printer of a light intensity modulation type wherein a light output power versus current characteristic of a light beam emitted from a semiconductor laser at a focusing position onto a photo-conductor drum is made to be linear so that the quantity of light can be changed to one of a plurality of power levels accurately and therefore printing dots arithmetically changing in diameter or size are generated, thus realizing high-resolution multiple density printing.

As a printer for analog printing, there is known an electric photograph system (electric photograph recording system). One of the electric photograph systems is a laser printer (laser beam printer) which has two types, that is, pulse width modulation and light intensity modulation.

The laser printer of the light intensity modulation type controls a light output power of a semiconductor laser element according to image information to change the spot size of a light beam focused on a surface of a photo-conductor drum (photo conductor) and to control the size of a printing dot for multiple density printing.

An image quality adjusting device for the laser printer is disclosed, for example, in JP-A-3-269456. This literature discloses a technique for solving the problem of non-linear light output power versus characteristics at the time of multiple density printing by increasing the sensitivity level of a photo sensitive material to use only a good linear area thereof.

Also disclosed in "SID 9 DIGEST", pp. 278–299 is a technique for modifying a dot size or printing position. Further disclosed in IEEE Journal of Quantum Electronics, Vol. QE-21, No. 8, Aug.1985, pp. 1264–1270 is mode-hopping noise in a semiconductor laser.

The inventors of the present application suggest, for the purpose of improving the performance of multiple density printing in a laser printer, a technique for controlling the small spot size of a laser beam by setting a light intensity distribution of the laser spot to be triangular (refer to JP-A-9-74251). In this literature, in order to set the light intensity distribution of the laser spot to be triangular, a non current injected area having a length of about 70 $\mu$m is provided at halfway (at a position about 30 $\mu$m away from its end) of a stripe-shaped waveguide so that the phase difference between fundamental and higher modes is $\pi/2$ at a laser facet.

A technique for providing a non current injected window area at both facets for the purpose of preventing destruction of the facets from which a light beam of a semiconductor laser is emitted, is disclosed, for example, in JP-A-62-65391 and JP-A-62-179193. However, these techniques fail to disclose an application example of improving the linearity of a light output power versus current characteristic of a semiconductor laser.

The electric photograph system (electric photograph recording system) has a function of scanningly directing the spot of a light beam emitted from a semiconductor laser element according to image information onto a surface of uniformly charged photo conductor (such as a photo-conductor drum) for exposure thereof, emitting electric charges therefrom in such a manner that the potential of the surface of the photo-conductor drum is reduced to zero to thereby form an electric potential image, and changing the quantity of a light beam to a plurality of levels at the time of the scanning exposure to change the size of the electric potential image for multiple density printing.

In the prior art laser printer, multiple density printing is carried out by controlling the light output power of a semiconductor laser as a light source to a plurality of intensities to control the size of printing dot.

Explanation will now be made as to an exposing optical system of a general laser printer (laser beam printer), by referring to FIG. 21. In the printing of the laser printer, as shown in FIG. 21, a laser beam 2 emitted from a semiconductor laser 1 is made parallel or collimated by a collimate lens 3, and the collimated beam is once focused on a polygon mirror 5 by a cylindrical lens 4. The laser beam 2 reflected by the polygon mirror 5 is focused through a non-spherical lens system 6 on a drum coated with a photo conductor 7, that is, on a photo-conductor drum 8, so that the photo-conductor drum 8 is scanned with the beam at a constant speed along the axial direction of the drum. The surface of the photo-conductor drum 8 is previously charged uniformly, so that, when the drum is scanned with the laser beam, electric charges on the surface are discharged therefrom and thus the surface potential of the photo-conductor drum 8 is reduced to zero.

When toner particles are electrically adsorbed on an electric potential image thus formed, a toner image is formed and then printed. Since the toner electric adsorption takes place on the surface of the photo conductor subjected to beam exposure with a constant light intensity or more, a change in the light output power of the semiconductor laser enables a change of the size (printing dot size) of a dot to be printed, thus realizing multiple density printing.

The inventors of the present application have analyzed and studied an exposing optical system for the purpose of obtaining high-resolution multiple density printing, and have found that, with respect to the size of a printing dot formed by a beam spot focused on the photo-conductor drum of a laser printer, it is difficult to obtain accurate levels of multiple densities, i.e., high-resolution multiple density printing in an area having small printing dot sizes.

That is, the prior art laser printer is arranged so that the light beam to be focused on the photo-conductor drum is obtained by collimating or converging a laser beam emitted from the semiconductor laser element with use of the aforementioned optical system and by changing the optical path of the beam for laser printing. Accordingly the light intensity of the light beam irradiated onto the photo-conductor drum is the light output power itself of the semiconductor laser (semiconductor laser element), which largely depends on the characteristic of the semiconductor laser element.

In general, with regard to the light output power of a semiconductor laser element, it is already known that the linearity of a light output power versus current characteristic is deteriorated in its low optical power range, but it is not recognized that the fact adversely affects high-resolution multiple density printing of the laser printer.

In other words, in the laser printer, as the number of power levels increases, the range of light output power of a laser beam used is required to be broad and correspondingly a low optical power range is also required to be inevitably used.

In a high-resolution laser printer, it is demanded that printing be carried out with a printing dot finely changing arithmetically in size, but irregular change in the printing dot size in the low optical power range makes it difficult to obtain high-resolution laser printing.

FIG. 22(a) shows a graph of a light output power versus current characteristic of a semiconductor laser element, and FIG. 22(b) shows, in a model form, an example of a printing dot changing arithmetically in size. In FIG. 22(a), positions denoted by white and black small circles are current positions at which the printing dot is to be formed, and the current value of each position is arithmetically selected.

In FIG. 22(a), a characteristic line A denotes an actual characteristic and a characteristic line B is an ideal characteristic desirable for multiple density printing. On the characteristic line B as the ideal characteristic, there is a clear inflection point in a low optical power part. In a large current area subsequent to the inflection point, the characteristic line A is linear (exhibits a linearity). Thus when the current value is arithmetically changed in the area exhibiting the linearity, the size of the printing dot can be sequentially arithmetically changed, for example, from 1 to 7, though partially shown in FIG. 22(b).

However, as shown by the characteristic line A in FIG. 22(a), the output of the laser beam emitted from the semiconductor laser element is nonlinear in its area having small light output powers (low optical power range), that is, the characteristic line A is bent or inflected downwardly. Thus when the current value is arithmetically changed in an area including the above nonlinear part, the size of the printing dot can be arithmetically changed in a high-current-value area, but the dot size can be changed non-arithmetically in a low-current-value area. As a result, the change of the printing dot size formed in the low-current-value area become non-arithmetical, thus making it difficult to realize high-resolution laser printing.

More specifically, in such a simple proportional control method that a driving current is divided into n levels, from an output power of level 1 to an output power of level n as shown in FIG. 22(a), the light intensity cannot be controlled at equally-spaced levels and thus it is difficult to obtain high-resolution laser printing.

With respect to such non-linearity of the light output power, a problem takes place when the change range of the light output power becomes broad, even in the invention (disclosed in JP-A-9-74251) for improving a spot size control in an electric photograph system or even in the invention disclosed in JP-A-3-269456. That is, in the invention disclosed in JP-A-3-269456, use of a light output power range to provide a good-linearity light output power versus current characteristic obtained by setting its sensitivity to a low level means that an increase in the number of light output power levels increases the light intensity of the maximum light exposing level, which results in that it becomes difficult to realize it because the light output power of the semiconductor laser has a limit and it also involves other problems with the performance and life of the photo conductor of the laser printer.

Even in the invention disclosed in JP-A-9-74251, the invention is valid so long as the linearity of the light output power is used in its good area, but the invention is not designed to improve the linearity of the light output power, and has the same problems as in the invention of JP-A-3-269456 in that the lowest light exposing level in the multiple density printing must be relatively high.

SUMMARY OF THE INVENTION

It is therefore an object of the present invention to provide an electric photograph system wherein an electric potential image is formed to realize multiple density printing while printing dots having different sizes are formed on a photo-conductor drum by a light intensity modulation method, and wherein a means for correcting a light output power characteristic of a light beam at a focusing position on the photo-conductor drum is provided in a semiconductor laser itself or in a passage area of a laser beam emitted from a semiconductor laser so as to exhibit a linearity not only in a low optical power range but also in other optical power range.

Another object of the present invention is to provide an electric photograph system which can arithmetically regularly change the size of a printing dot to be formed on a photo-conductor drum by a light intensity modulation even in a low optical power range and can realize high-resolution multiple density printing.

Typical ones of embodiments of the invention disclosed in the present application are briefly summarized as follows.

(A) In accordance with a first aspect of the present invention, there is provided an electric photograph system wherein a light beam emitted from a semiconductor laser is scanningly focused on a surface of a photo-conductor drum controllably rotated by an exposing optical system, and a light output power of the semiconductor laser is controlled so that an electric potential image is formed while printing dots having different sizes are formed on the photo-conductor drum to realize multiple density printing, and wherein a saturable absorber (correction means) exhibiting a saturable absorbing characteristic is provided for correcting a light output power versus current- characteristic of the semiconductor laser in such a manner that a light output power characteristic of the light beam at a focusing position on the photo-conductor drum exhibits a linearity even in a low optical power range.

The saturable absorber is formed (a) in a light guiding structure of a semiconductor laser, (b) in an insulator layer below an electrode away from the light guiding structure (optical waveguide), (c) on a facet of the optical waveguide of the semiconductor laser, or (d) on an optical window facet of a package having the semiconductor laser built therein.

(a) When the saturable absorber is provided in the light guiding structure of the semiconductor laser, (1) the saturable absorber is formed in the form of a non current injection area provided in a part of the light guiding structure of the semiconductor laser element.

(2) The saturable absorber is formed by providing a low density current injected area which is a part of the optical waveguide of the semiconductor laser element and which is smaller in current injection density than the other areas. For example, the low density current injected area includes a plurality of non current injected areas and a plurality of current injected areas.

When the saturable absorber is provided in the light guiding structure of the semiconductor laser, the intensity of the saturable absorption is suitably high enough to cancel the contribution of spontaneous light emission to the laser beam in the vicinity of a threshold current.

(b) The saturable absorber is formed in the insulator layer below the electrode away from the light guiding structure (optical waveguide). That is, the semiconductor laser has a semiconductor layer of a first conductivity type provided with a strip part which defines the optical waveguide, an insulator layer formed on the semiconductor laser of the first conductivity type other than the stripe part, and an electrode formed on the insulator layer and stripe part and electrically connected directly to the semiconductor laser of the first conductivity type or indirectly thereto via a single or a plurality of other semiconductor lasers of the first conductivity type. The insulator layer is made of a silicon dioxide film provided on the semiconductor laser of the first conductivity type, an amorphous silicon film provided on the silicon dioxide film, and another silicon dioxide film formed on the amorphous silicon film. The amorphous silicon film forms a saturable absorber.

(c) When the saturable absorber is provided in the facet of the optical waveguide of the semiconductor laser as an example, a thin film layer having a absorption characteristic to the laser beam is provided in a reflection film formed on the facet of the semiconductor laser element (semiconductor laser chip).

(d) When the saturable absorber is provided on the optical window facet of the package having the semiconductor laser built therein, a thin film layer having an absorption characteristic to the laser beam is provided in an anti-reflection coated film provided on a light exit window of the semiconductor laser package.

Such a saturable absorber may be, in principle, provided at any position in the optical path. For the purpose of causing light absorption to usually take place with a sufficiently weak light intensity, however, it is preferable that the saturable absorber is located in the optical path, in particular, at a position having a high light beam density.

In the case of the above means (A), since the saturable absorber acts to always reduce a predetermined light output power, the characteristic line of the light output power versus current characteristic of the semiconductor laser is lowered downwards as a whole, which results in that the light output power characteristic of the laser beam at the focusing position on the photo-conductor drum can exhibit a linearity even in a low optical power range as in the other optical power ranges. Thus when the current value for formation of an printing dot is arithmetically changed, a printing dot arithmetically varying in its dot size can be generated with a high accuracy. Accordingly high-resolution laser printing can be attained.

The saturable absorbing characteristic as used in this specification exhibits a phenomenon which follows. In such a substance that electrons at a first level absorb energy of photons to transit to its second level for light absorption, in general, as the light intensity becomes sufficiently strong, the number of electrons at the first level decreases while the number of electrons at the second level increases, which results in that it becomes difficult for the light absorption to take place. In other words, such a phenomenon takes place that light absorption is saturated. The occurrence condition of such saturated light absorption is determined by the transition probability of the two levels, level densities and the relaxation time of excited electrons. An substance wherein the above values are suitable and the saturation of the light absorption takes place in the light intensity range of a semiconductor laser, is known as a saturable absorber, which exhibits a strong light absorption characteristic for light having intensities of a constant level or less but exhibits substantially no light absorption characteristic for light having intensity exceeding the constant level.

The above and other objects and novel features of the present invention will become clear as the following description of the invention advances as detailed with reference to preferred embodiments of the invention as shown in accompanying drawings.

BRIEF DESCRIPTION OF THE DRAWINGS

FIG. 22 depicts a graph showing ideal and actual characteristics of a light output power versus current characteristic of a semiconductor laser element to be built in the prior art laser printer, and also diagrammatically shows a printing dot which arithmetically changes in gradient.

DESCRIPTION OF THE EMBODIMENTS

Figure 1:
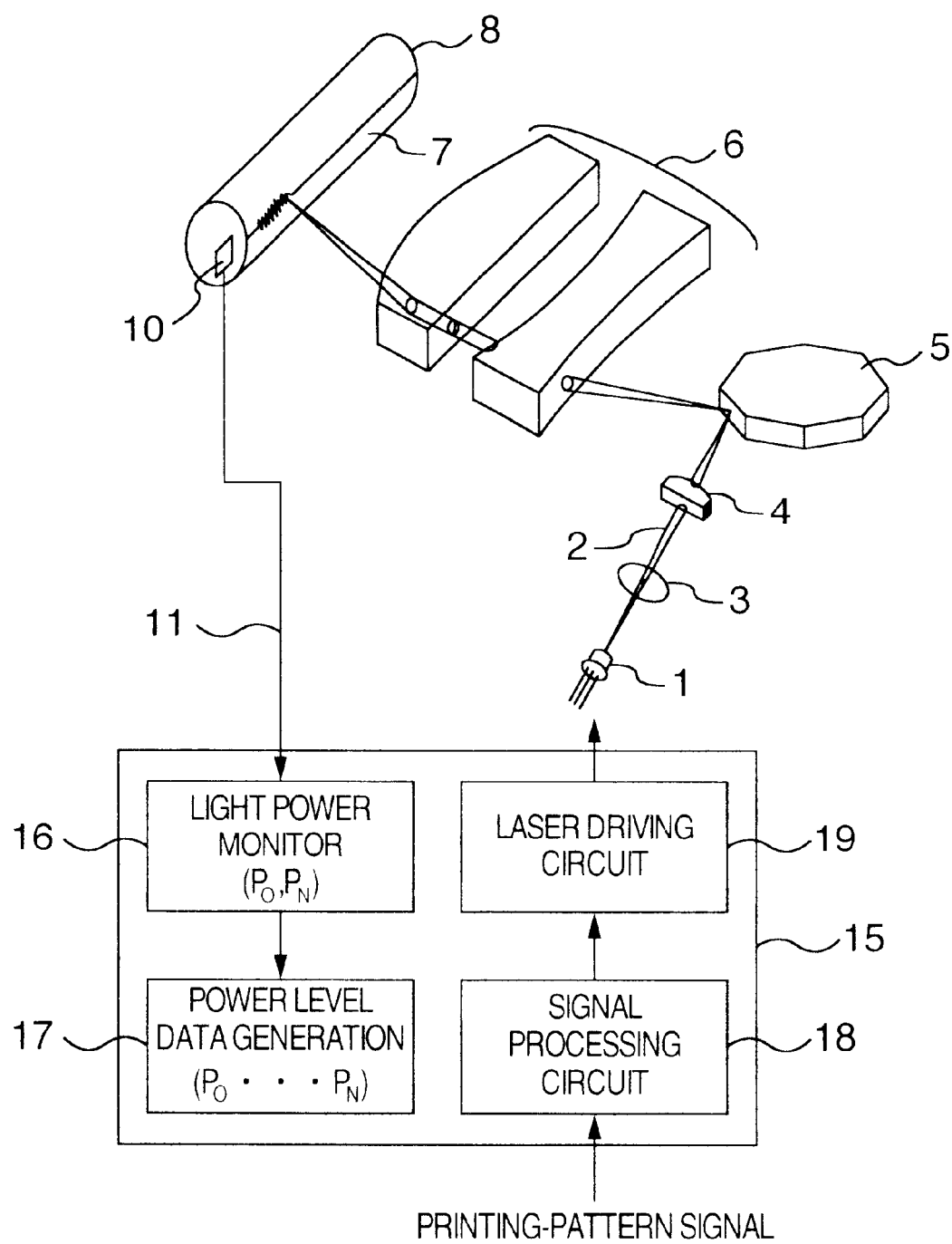
FIG. 1 diagrammatically shows an exposing optical system of a laser printer as an embodiment (embodiment 1) of the present invention as well as a semiconductor laser driving system therefor.

Embodiments of the present invention will be detailed with reference to accompanying drawings, wherein parts having the same functions are denoted by the same reference numerals and repetitive explanation thereof is omitted.

Embodiment 1

FIGS. 1 to 11 are directed to an electric photograph system in accordance with an embodiment (embodiment 1) of the present invention. In the present embodiment 1, explanation will be made in connection with an example wherein the present invention is applied to a laser printer as an electric photograph system.

In the present embodiment 1, explanation will be made in connection with an example wherein the present invention is applied to an electric photograph system (electric photograph recording system) of a light intensity modulation type for analog printing, for example, to a laser printer (laser beam printer).

In the present embodiment 1, a means (saturable absorber) for correcting the non-linearity of a light output power versus current characteristic in a low optical power range is provided in the form of a non current injected area provided in a part of a light guiding structure (optical waveguide) of a semiconductor laser.

FIG. 1 diagrammatically shows an exposing optical system of a laser printer of the present embodiment 1 as well as a semiconductor laser driving system therefor. As shown in FIG. 1, a laser beam 2 emitted from a semiconductor laser 1 is collimated through a collimate lens 3 into a parallel or collimated beam, the collimated beam is once focused through a cylindrical lens 4 onto a polygon mirror 5. The laser beam 2 reflected by the polygon mirror 5 to be rotatably controlled, is focused on a drum coated with photo conductor 7, i.e., on a photo-conductor drum 8 via a non-spherical lens system 6 so that the photo-conductor drum 8 is scanned with the laser beam at a constant speed along an axial direction thereof A surface of the photo-conductor drum 8 is previously electrically charged uniformly. When the drum surface is scanned with the light beam, electric charges on the surface are discharged so that the potential on the drum surface of the photo-conductor drum 8 is reduced to zero. The photo-conductor drum 8 is controllably rotated in synchronism with the scanning operation. This results in that an electric potential image is formed on the surface of the photo-conductor drum 8. Accordingly when toner particles are electrostatically adsorbed on the formed electric potential image, a toner image can formed and then printed.

A photodetector 10 is arranged at one side of the photo-conductor drum 8. The photodetector 10 acts to detect the light intensity and start position of the scanning laser beam 2, i.e., of the scanning beam irradiated on the photo-conductor drum 8 as a detected signal, and sends the detected signal 11 to a controller 15. The photodetector 10 not shown is provided to be positioned adjacent to the photo-conductor drum, so that, prior to the light scanning on the drum, input of a light signal to the detector causes positioning of the exposing signal on the drum.

The controller 15 has various processing circuits, that is, as shown in FIG. 1, has a light power monitor circuit 16 for monitoring a light power, a power level data generation circuit 17 for generating power level data on the basis of an output of the light power monitor circuit 16, a signal processing circuit 18 for receiving an output signal of the power level data generation circuit 17 and a printing-pattern signal based on image information for signal processing, and a laser driving circuit 19 for receiving an output signal of the signal processing circuit 18 to drive the semiconductor laser 1.

The power level data generation circuit 17 generates a power level data signal on the basis of the output signal of the light power monitor circuit 16. The power level data signal includes a fundamental lowest signal $P_0$ and a fundamental highest signal $P_N$. For example, the power level data generation circuit 17 generates an arithmetically-varying power level data signal of $P_0$ to $P_N$. Thus the driving current of the semiconductor laser 1 is controlled by a signal corresponding to the power level data signal of $P_0$ to $P_N$, so that a printing dot arithmetically changing is formed on the photo-conductor drum 8. Printing dots (electric potential image) having different sizes are displayed on the photo-conductor drum 8.

Figure 2:
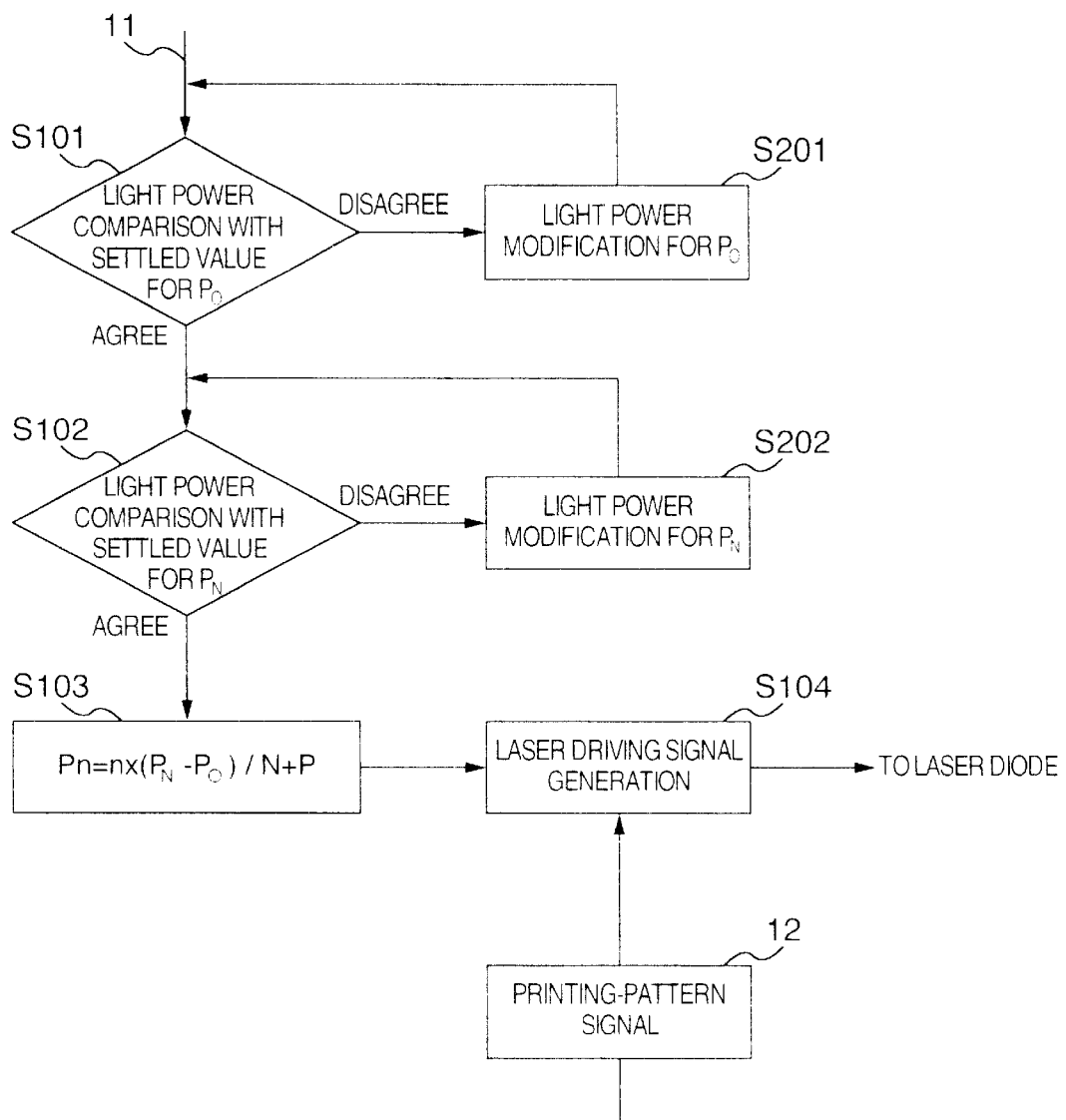
FIG. 2 is a flowchart for explaining the operation of a light output power control system of the laser printer in the present embodiment 1.

FIG. 2 is a flowchart for explaining the operation of a multiple density printing system based on the detected signal 11 issued from the photodetector 10. The system first corrects a light output power arriving at the surface of the photo-conductor drum 8.

As shown in a step S101, the system compares the detected signal 11 when controllably driving the semiconductor laser 1 so that the detected signal becomes the fundamental lowest signal $P_0$, with a predetermined set value. When finding a coincidence therebetween, the system proceeds to a step S102. When finding a non-coincidence therebetween, the system goes to a step S201 where the driving current of the semiconductor laser 1 is corrected so that the detected signal 11 becomes the signal $P_0$, and feeds the correction information back to the controller 15.

In the step S102, the system compares the detected signal 11 when controllably driving the semiconductor laser 1 so that the detected signal becomes the fundamental highest signal $P_N$, with a predetermined set value. When finding a coincidence therebetween, the system proceeds to a step S103. When finding a non-coincidence therebetween, the system goes to a step S202 where the driving current of the semiconductor laser 1 is corrected so that the detected signal 11 becomes the signal $P_N$, and feeds the correction information back to the controller 15.

In the S103, on the basis of the correction at the steps S101 and S201 and the correction at the steps S102 and S202, the system determines and outputs a light output power $P_N$ for multiple density printing through calculation.

On the basis of the above output signal and a printing-pattern signal 12 transmitted from a host computer, the system generates a then driving signal of the semiconductor laser 1 to drive the semiconductor laser 1 in a step S104. The light output power $P_N$ is given by an equation (1) which follows.

$$P_n = \frac{n \times (P_n - P_0)}{N} + P_0 \quad (1)$$

where N denotes the number of laser power levels.

Figure 3:
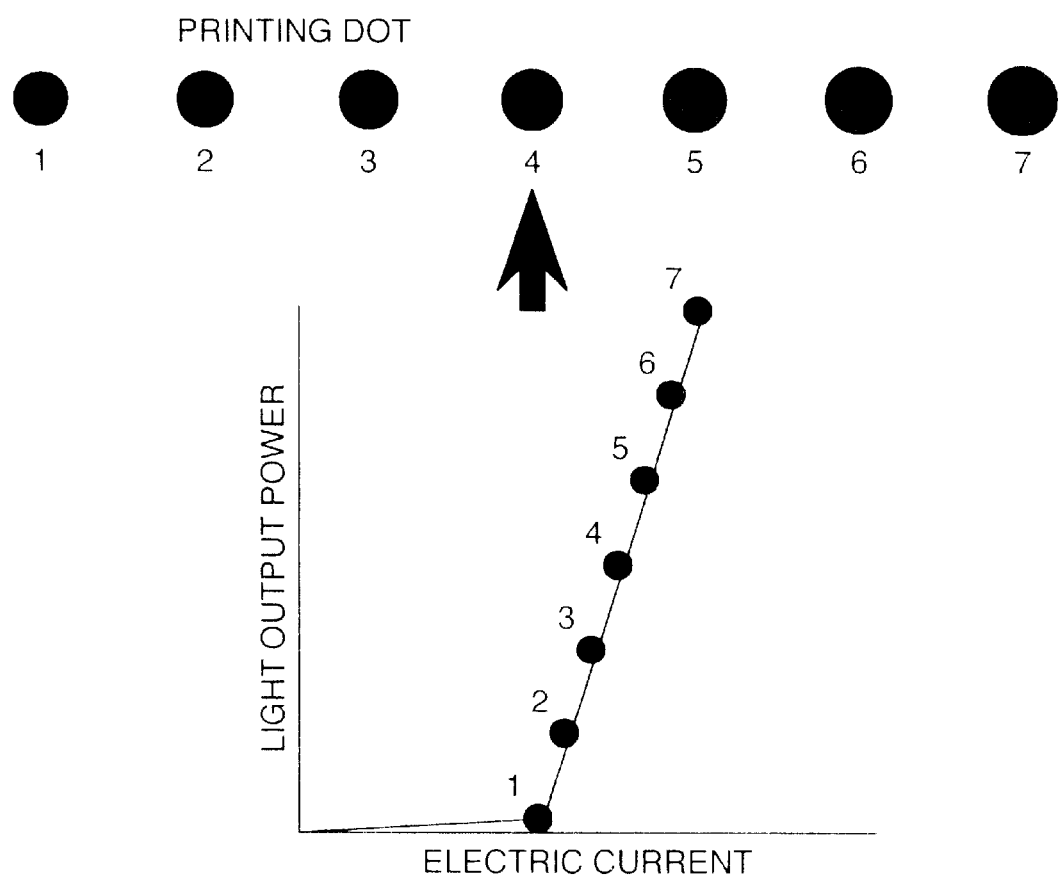
FIG. 3 is a graph showing a relationship between multiple density printing of the laser printer and the light output power of the semiconductor laser.

In the present embodiment 1, as shown by a light output power versus current characteristic in FIG. 3, a semiconductor laser is used which exhibits the linearity of a characteristic line linear in areas extended from its threshold value to the maximum light output power, so that, when a current to be applied to the semiconductor laser is arithmetically changed to drive the semiconductor laser for multiple density printing, the size of the printing dot on the surface of the photo-conductor drum 8 arithmetically varies. In FIG. 3, when the threshold value, that is, the current value of the light output power lowest at the inflection point is set to 1, the current value at the time of the maximum light output power is set to 7, and the current value is changed between 1 and 7; the size (diameter) of the printing dot as shown by 1 to 7 varies arithmetically and the gradient is controlled highly regularly.

Explanation will next be made as to the semiconductor laser. In this connection, although the semiconductor laser or laser diode is widely used as its naming, a semiconductor laser built in a compound semiconductor will be generally called a semiconductor laser element or semiconductor laser chip and the semiconductor laser element built in a package will be called a semiconductor laser device, hereinafter.

The present invention has such arrangements as will be shown below, that is, arrangements wherein a correction means (saturable absorber exhibiting a saturable absorbing characteristic) for regularly arithmetically changing the size of a printing dot on the surface of the photo-conductor drum is provided in an interior of a semiconductor laser element forming a semiconductor laser, wherein the correction means is provided on a light exit surface of the semiconductor laser element, and wherein the correction means is provided on a optical window facet provided on a package of a semiconductor laser device forming a semiconductor laser. Accordingly the following description will be directed to the respective embodiments using a so-called semiconductor laser element (semiconductor laser chip) and semiconductor laser device other than the semiconductor laser.

Figure 4:
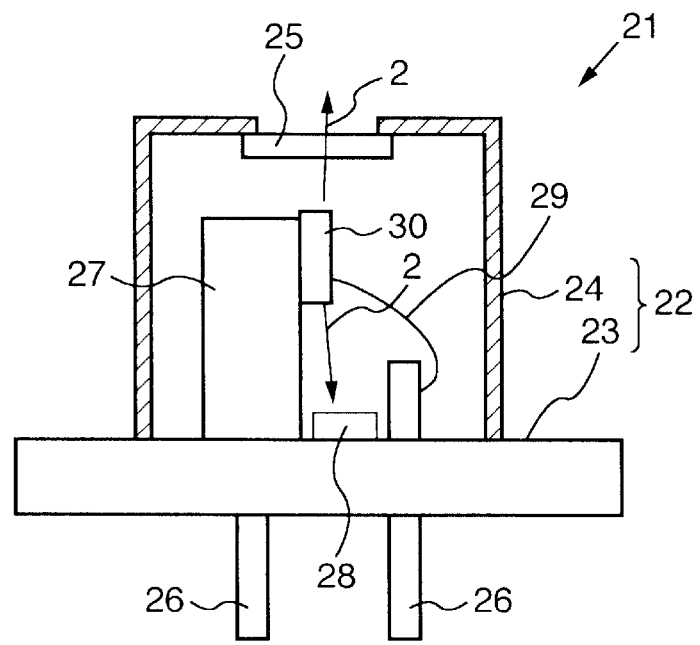
FIG. 4 diagrammatically shows the semiconductor laser device.

In the arrangement of the present embodiment 1, a saturable absorber as the correction means is provided in the interior of a semiconductor laser element. FIG. 4 shows a semiconductor laser device 21 having a semiconductor laser element (semiconductor laser chip) 30 built therein, which corresponds to the semiconductor laser 1 of FIG. 1.

A package 22 of the semiconductor laser device 21 is made up of a disk-shaped metallic stem 23 and a hollow cap 24 fixed so as to air-tightly cover an upper surface of the stem 23. An upper surface of the cap 24 is formed in its center with a through hole and a transparent glass plate 25 is provided on the hole so as to air-tightly close the hole. The hole and glass plate 25 form a optical window facet for transmission of a laser beam therethrough.

The stem 23 is fixedly provided with three lead wires 26. Two of the lead wires 26 are passed through the stem 23 and fixed to the stem 23 as electrically isolated therefrom via an insulator and as to face the interior of the package 22 in its inner end. Remaining one of the lead wires 26 is connected to the stem 23 to have the same potential as the stem.

A metallic heat sink 27 is fixed on an upper surface of the stem 23, and the semiconductor laser element 30 is fixed to the heat sink 27 itself. In actual, since the semiconductor laser element 30 is small and it is hard to handle it, it is general that the element is mounted on a submount as a small piece and the submount with the element is fixed to the heat sink 27. However, explanation thereof is omitted. A lower electrode of the semiconductor laser element 30 is electrically connected to the stem 23.

The semiconductor laser element 30 faces the glass plate 25 in its front light emitting surface and faces the upper surface of the stem 23 in its backward light emitting surface, with which attitude the element is fixed to the heat sink 27. For the purpose of receiving light from the backward light exit surface, a light receiving element 28 is fixed on the upper surface of the stem 23. A lower electrode of the light receiving element 28 is also electrically connected to the stem 23.

An inner end of one of the lead wires 26 fixed to the stem 23 as electrically isolated therefrom is fixed to the upper electrode of the semiconductor laser element 30 via a conductive wire 29, and an inner end of the other lead wire 26 is fixed to an upper electrode of the light receiving element 28 via the conductive wire 29.

When a predetermined voltage is applied between a pair of the lead wires 26 electrically connected to the upper and lower electrodes of the semiconductor laser element 30 respectively, a laser beam (front exit beam or backward exit beam) 2 emits from the light emitting surface of the semiconductor laser element 30. The light intensity of the backward emitted beam is monitored by the light receiving element 28.

Figure 5:
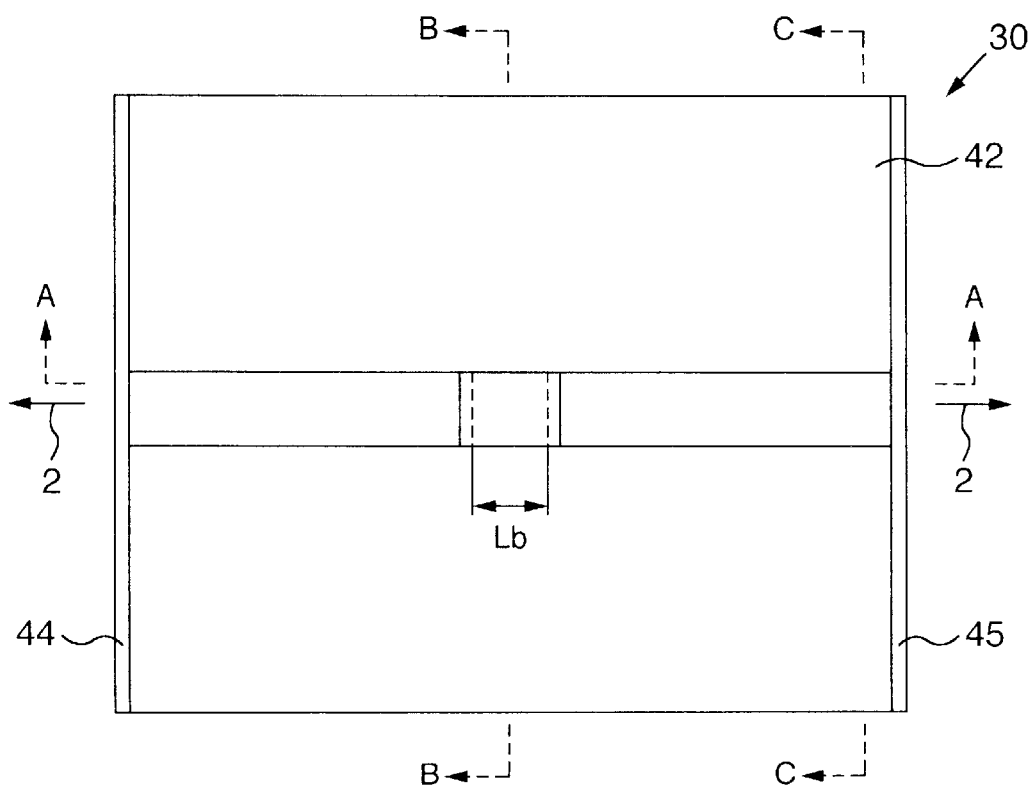
FIG. 5 is a plan view of a semiconductor laser element to be built in the semiconductor laser device.
Figure 6:
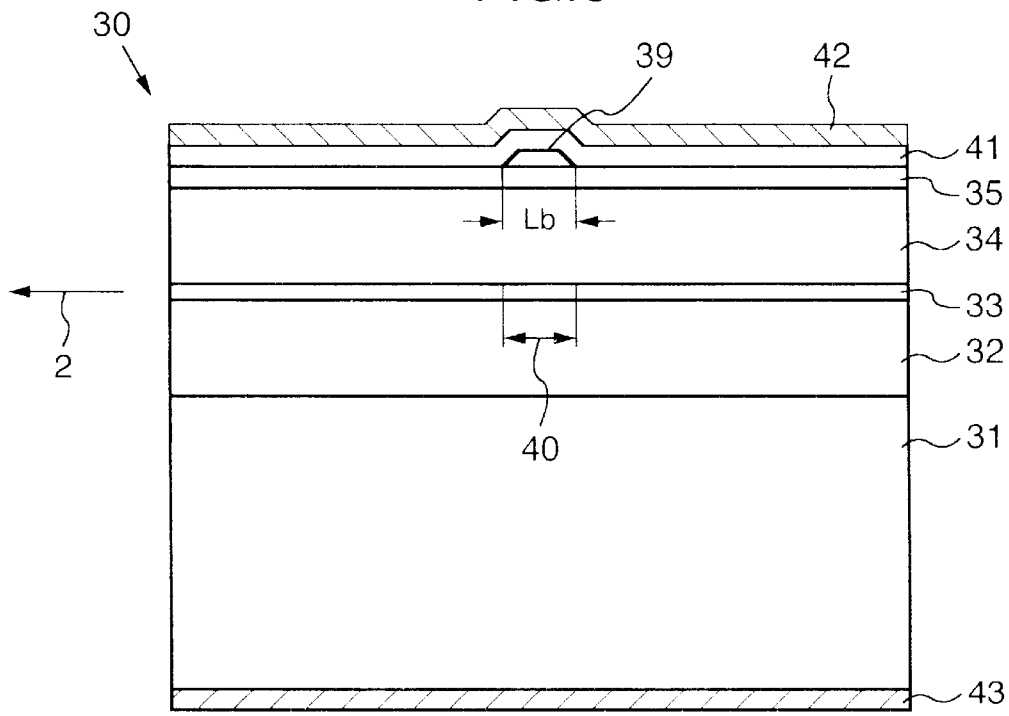
FIG. 6 is a cross-sectional view of the semiconductor laser element taken along line A—A in FIG. 5.
Figure 7:
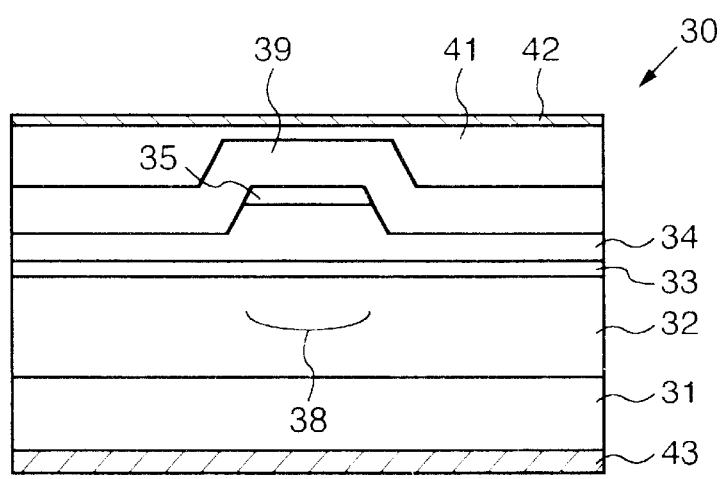
FIG. 7 is a cross-sectional view of the semiconductor laser element taken including a non current injected area along line B—B in FIG. 5.
Figure 8:
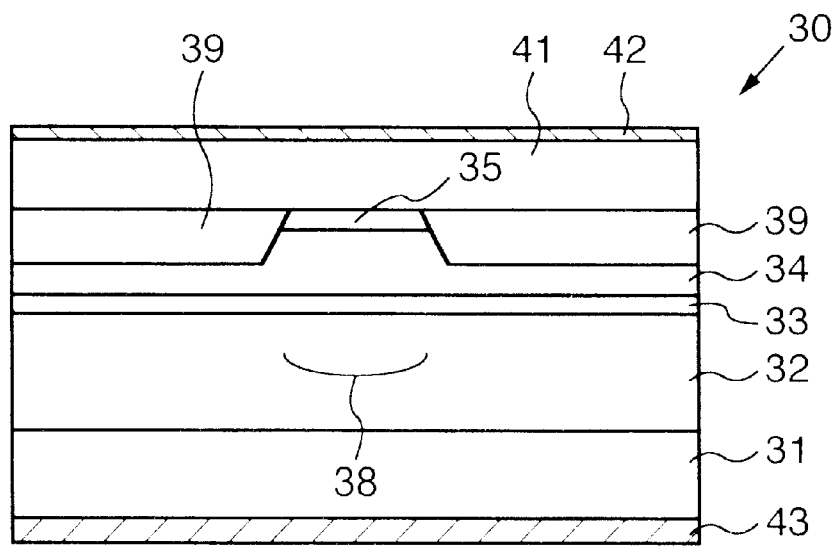
FIG. 8 is a cross-sectional view of the semiconductor laser element taken along line C—C in FIG. 5.

Explanation will then be made as to the structure of the semiconductor laser element and a characteristic thereof with use of FIGS. 5 to 10. In this connection, FIG. 5 is a plan view of the semiconductor laser element, FIG. 6 is a cross-sectional view taken along line A—A in FIG. 5, FIG. 7 is a cross-sectional view taken along line B—B in FIG. 5, and FIG. 8 is a cross-sectional view taken along line C—C in FIG. 5.

The semiconductor laser element 30, as shown in FIGS. 5 to 8, has a rectangular structure wherein a plurality of semiconductor layers are formed on an n type GaAs substrate 31 respectively in the form of a predetermined pattern. An anode electrode 42 is provided on an upper surface of the structure, a cathode electrode 43 is provided on a lower surface of the structure, and reflective films 44 and 45 are provided on both light exit surface of the laser beam 2 respectively.

In the semiconductor laser element 30, as shown in FIGS. 6 to 8, sequentially formed on the n type GaAs substrate 31 are an n type clad layer 32 of $Al_{0.5}Ga_{0.5}As$ having a thickness of 1.8 μm and an impurity (Se) concentration of $7 \times 10^{-7}$ cm$^{-3}$, a multi-quantum-well active layer 33, a p type clad layer 34 of $Al_{0.5}Ga_{0.5}As$ having a thickness of 1.8 μm and an impurity (Zn) concentration of $1 \times 10^{18}$ cm$^{-3}$, and a p type cap layer 35 of GaAs having a thickness of 20 nm and an impurity (Zn) concentration of $1 \times 10^{19}$ cm$^{-3}$. The multi-quantum-well active layer 33 is made up of $Al_{0.1}Ga_{0.9}As$ well layers (having a thickness of 7 nm) as three layers and $Al_{0.3}Ga_{0.7}As$ barrier layers (having a thickness of 4 nm) as four layers sandwiching the earlier-mentioned layers.

The p type cap layer 35 and p type clad layer 34 form a stripe-like area 38 having a width of about 4 μm along the center of the semiconductor laser element 30. The stripe-like area 38 is formed by sequentially forming the semiconductor layers (p type cap layer 35 as the uppermost layer) on the n type GaAs substrate 31 and then selectively etching the resultant laminated structure until its residual thickness becomes about 0.3 μm.

Meanwhile, an n-current blocking layer 39 of GaAs is formed in an area where the p type clad layer 34 is removed. An area nearly corresponding to the stripe-like area 38 of the multi-quantum-well active layer 33 forms a cavity (optical waveguide), but the n-current blocking layer 39, as shown in FIGS. 5 and 6, covers the p type cap layer 35 by a constant length Lb along the direction of the optical waveguide. Since the current of the area of the n-current blocking layer 39 selectively formed for the stripe-like area 38 is shielded, no current is supplied to a part of the optical waveguide and thus to form a non current injected area 40. A saturable absorber exhibiting a saturable absorbing characteristic is made up of the optical waveguide and the n-current blocking layer 39 selectively formed on the optical waveguide. The non current injected area 40, that is, the saturable absorption area also has a length of about Lb.

A p-GaAs layer 41 to be formed as a cap layer is provided on the n-current blocking layer 39 and exposed p type cap layer 35. The anode electrode 42 is formed on the p-GaAs layer 41 and the cathode electrode 43 is formed on a lower side of the n type GaAs substrate 31.

The semiconductor laser element 30 is manufactured by forming element parts (chip parts) to be later formed as semiconductor laser elements on a single sheet of large-diametered semiconductor substrate (called a wafer) as vertically and horizontally aligned, cleaving its crystal to form strips, providing the reflective films 44 and 45 on both cleavage planes, and dividing the wafer at boundaries between the element parts to form semiconductor laser elements 30. Accordingly, the reflective films 44 and 45 are provided ion the light exit surfaces of the laser beam 2, as shown in FIG. 5.

The reflectances of the reflective films 44 and 45 are selected so that the light output power of the laser beam is large because the beam going out from the front light exit surface as one of the both light exit surfaces is used as the laser beam, while the beam going out from the backward light surface as the other is used as a monitor beam for measurement of the light intensity of the laser beam. For example, the reflective film 44 on the front light exit surface has a reflectance of 60% and the reflective film 45 has a reflectance of 80%.

In such an semiconductor laser element 30, when a predetermined voltage is applied between the anode and cathode electrodes 42 and 43, an area nearly corresponding to the stripe-like area 38 of the multi-quantum-well active layer 33 forms a cavity (optical waveguide) which emits the laser beam 2 from the light exit surfaces at its both ends.

In the semiconductor laser element 30 of the present embodiment 1, however, the n-current blocking layer 39 is partially provided on the upper surface of the p type cap layer 35 corresponding to the optical waveguide as shown in FIG. 6. As a result, the multi-quantum-well active layer 33 or optical waveguide part corresponding to the n-current blocking layer 39 has the non current injected area 40 where no current flows as shown in FIG. 6, thus forming a saturable absorber exhibiting a saturable absorbing characteristic.

Due to the saturable absorbing characteristic of the saturable absorber, when the current value is arithmetically varied to emit the laser beam as shown in FIG. 3, the characteristic of the semiconductor laser element 30 varies arithmetically even in the size of the printing dot and thus fine multiple density printing can be realized.

Figure 9:
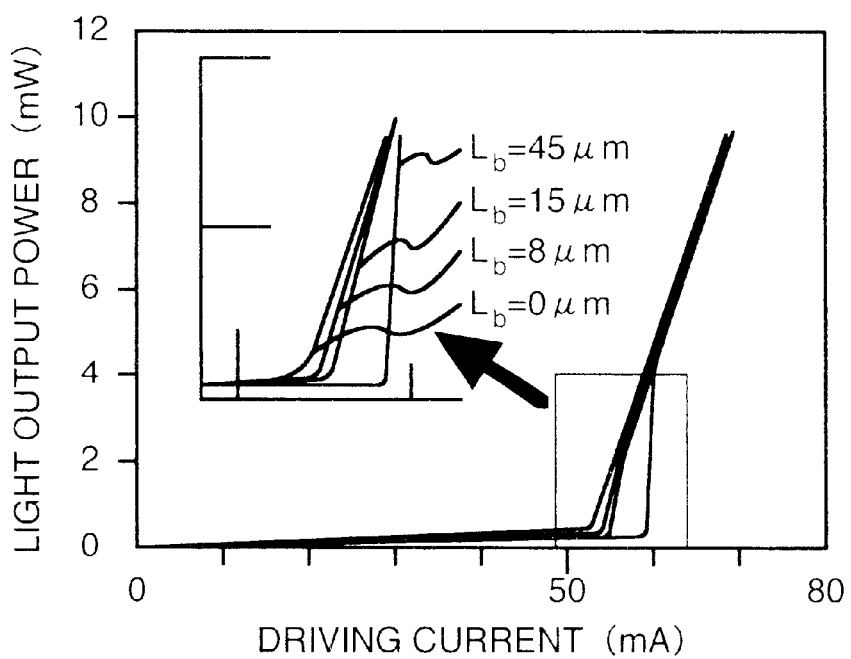
FIG. 9 is a graph showing a light output power versus current characteristic of the semiconductor laser element.

With regard to this point, since the active layer (multi-quantum-well active layer 33) of the non current injected area 40 exhibits a saturable absorbing characteristic and absorbs light at the time of a low output, light is absorbed in an area having a light output power versus current characteristic bent downwardly at the beginning of oscillation. However, when the light exceeds its constant intensity level, the light absorption is saturated and the laser beam start to emit. When the saturable absorption area is long, such a characteristic is obtained that, when the operating current exceeds its constant value, the light output power abruptly increases, as typically seen when the saturable absorption area length (Lb) in FIG. 9 is 45 $\mu$m. When the length Lb is 15 $\mu$m, such a saturable absorption characteristic remains more or less, but when the length Lb is 8 $\mu$m, a typical saturable absorbing characteristic cannot be observed and the light absorption can cancel the non-linearity of the light output power versus current characteristic, thus providing a good linear light output power versus current characteristic. As a result, a state wherein the light output power of the semiconductor laser varies in proportion to a current, can be obtained starting with its low output.

Figure 10:
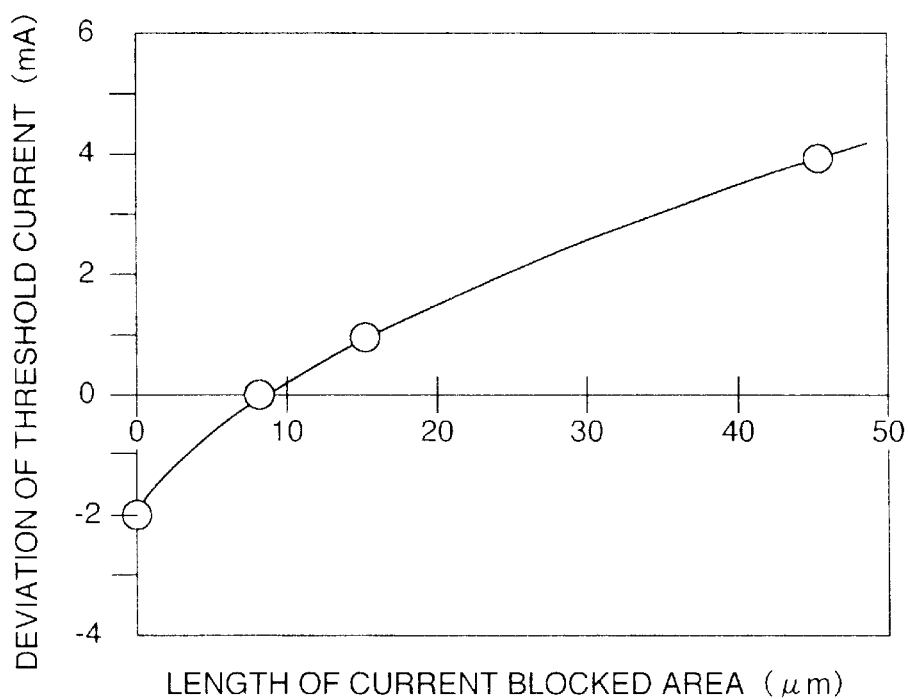
FIG. 10 is a graph showing a deviation in a threshold current to the length of the non current injected area in the semiconductor laser element.

FIG. 9 shows the non-linearity of a light output power in the form of a difference between an actual threshold current and an intersection of an extension line from its linear part with a current axis. A relationship with the non current injected area is shown in FIG. 10. It has been found from our experiment results that the length of the saturable absorption area is controlled suitably to be in a range of from 8 to 15$\mu$m. We can say that such an experiment result is suitable even when compared with a value of 3–9$\mu$m obtained by multiplying 300$\mu$m as the cavity length of the semiconductor laser by 0.01–0.03 the value of ./g.

Explanation will now be made as to non-linearity appearing in the low optical power range of a prior art semiconductor laser. The appearance of non-linearity in the light output power versus current characteristic in the low optical power range results from the fact that, in the active layer of the semiconductor laser having an optical gain, electric charges (electrons and holes) injected through current injection are recombined not only by laser-beam stimulated recombination but also even by spontaneous recombination, light emitted at which time is included in the laser beam. When the effect of the spontaneous emission is absent, the recombination probability of electric charges is proportional to the intensity of the laser beam, and therefore the laser beam reciprocates in the interior of the cavity is amplified by a factor of exp (2 gL), where 'g' is a gain coefficient proportional to the injected current and L is the length of the cavity.

The laser beam within the cavity is emitted and lost in accordance with the reflectance of the facets, on the other hand, so that, when the condition of an equation (2) given below when the amplification becomes equal to the loss are satisfied, laser oscillation starts.

$$\exp[g(I) \cdot L] \times R = 1 \qquad (2)$$

where g(I)a is the optical gain of the semiconductor laser, L is the length of the cavity, and R is the reflectance of the laser facet.

Once the laser oscillation starts, the laser cavity goes into its stable state where the condition of the equation (2) is satisfied. Thus it is considered that electric charges injected beyond its threshold current are all converted to light and after the start of the laser oscillation the injected current and light output power have a linear dependence.

When contribution of the spontaneous emission to the laser beam is considered, however, the light intensity within the cavity is required to satisfy a differential equation such as an equation (3) given below. Thus the resonance condition depends on the light intensity as given by an equation (4) given below and the aforementioned non-linearity takes place.

$$\frac{DL}{dx} = g(I) \cdot L + \sigma(I) \qquad (3)$$

$$\left\{ \left( I + \frac{\sigma(I)}{g(I) \cdot P} \cdot \frac{1-R}{R} \cdot \exp[g(I) \cdot L] - \frac{\sigma(I)}{g(I) \cdot P} \cdot \frac{1-R}{R} \right) \cdot R = 1 \right. \qquad (4)$$

where $\sigma$(I) denotes a spontaneous emission intensity and P denotes a laser output intensity.

In the present embodiment 1, in order to make it difficult for a non-linearity to appear in the low optical power range of the semiconductor laser, a parameter $\sigma/g$ is selected so that the non-linearity becomes linear. That is, in an actual semiconductor laser, the parameter $\sigma/g$ for determining the non-linearity is experimentally found according to an equation (5) which follows.

$$\frac{\sigma(I)}{g(I)} = \frac{\frac{V \cdot I_{th}}{e} \cdot \frac{h_c \Gamma}{\lambda L}}{\alpha_{los} + \frac{1}{L} \ln(R)} \qquad (5)$$

where V denotes an operating voltage, Ith denotes a threshold current, $\alpha_{los}$ denotes the cavity loss of the semiconductor laser, and Γ denotes the couplings efficiency of the active layer to the laser beam.

In the structure of the embodiment 1 of the present invention, a saturable absorption area exhibiting a saturable absorbing characteristic is provided to a part of the optical waveguide so that σ/g has a value of about 0.01–0.03.

Between 0.2 mW and 5 mW of the light intensity of the semiconductor laser element 30 in the present embodiment 1, there was obtained a nearly linear light output power versus current characteristic.

The threshold current of the semiconductor laser varies with its operating temperature. Thus in the laser printer of the present embodiment 1, the lowest and highest light output power levels were corrected by a correction circuit, the then currents were denoted by $I_1$ and $I_N$, and a current In was calculated on the basis of this with use of an equation (6) given below to obtain a light output power level 'n' for multiple density printing.

$$I_n = I_1 + (n-1) \cdot (I_n - I_1)/N \qquad (6)$$

where N is the number of all levels.

Due to the linearity of the light emission characteristic of the light source, such a simple feedback control enables stable and good control of light intensity of each level and enables acquisition of good multiple density printing with a good stability without influenced by variations in the ambient temperature, etc.

In an electric photograph system using the semiconductor laser element 30 having the aforementioned characteristic, there was obtained a light output power versus current characteristic where the light intensity on the surface of the photo-conductor drum 8 varies nearly linearly from 0.2 mW to 5 mW.

The present embodiment 1 has effects (1) to (3) which follow.

(1) Since the saturable absorber (correction means) acts always to reduce the predetermined light output power, this causes the characteristic line of the light output power versus current characteristic of the semiconductor laser to be lowered as a whole, which results in that the light output power characteristic of the laser beam at the focusing position of the photo-conductor drum exhibits its linearity as in the other optical power range even in the low optical power range.

(2) Accordingly due to the above fact (1), the printing dot to be formed on the surface of the photo-conductor drum 8 is formed by arithmetically changing the current value for driving of the semiconductor laser 1, with the result that the formed printing dot varies arithmetically in its size.

(3) In such printing that uses the printing dot arithmetically varying in its size as shown in the above (2), fine multiple density laser printing can be realized from the low optical power range to the high optical power range.

Embodiment 2

The present embodiment 2 is arranged so that, as in the foregoing embodiment 1, a saturable absorber as a correction means is provided in the interior of a semiconductor laser element. In the present embodiment 2, the operating current of the semiconductor laser is reduced and control of the saturable absorbing characteristic is improved. In the embodiment 2, a low current injection density area, which has a current injection density smaller than that in the other area and which is formed as a part of the optical waveguide of the semiconductor laser element, forms a saturable absorber. For example, the low current injection density area is formed by a plurality of non current injected areas and a plurality of current injected areas. When the saturable absorber is provided in the structure of the optical waveguide of the semiconductor laser, the saturable absorption has suitably an intensity enough to cancel the contribution of spontaneous emission to the laser beam in the vicinity of the threshold current.

Figure 11:
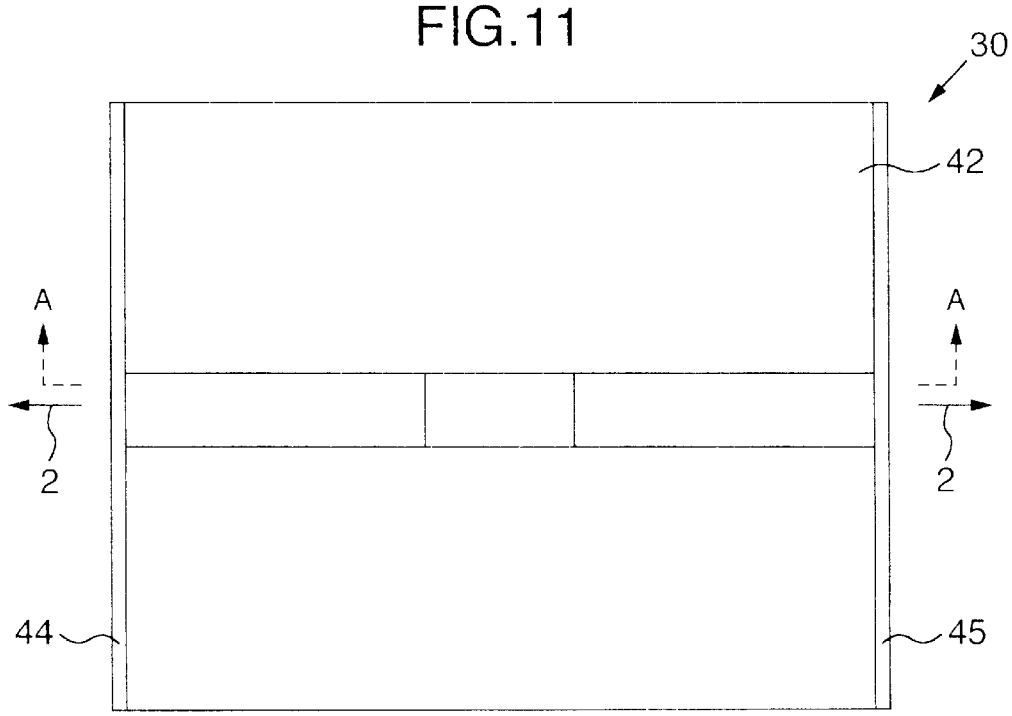
FIG. 11 is a plan view of a semiconductor laser element in another embodiment (embodiment 2) of the present invention.
Figure 12:
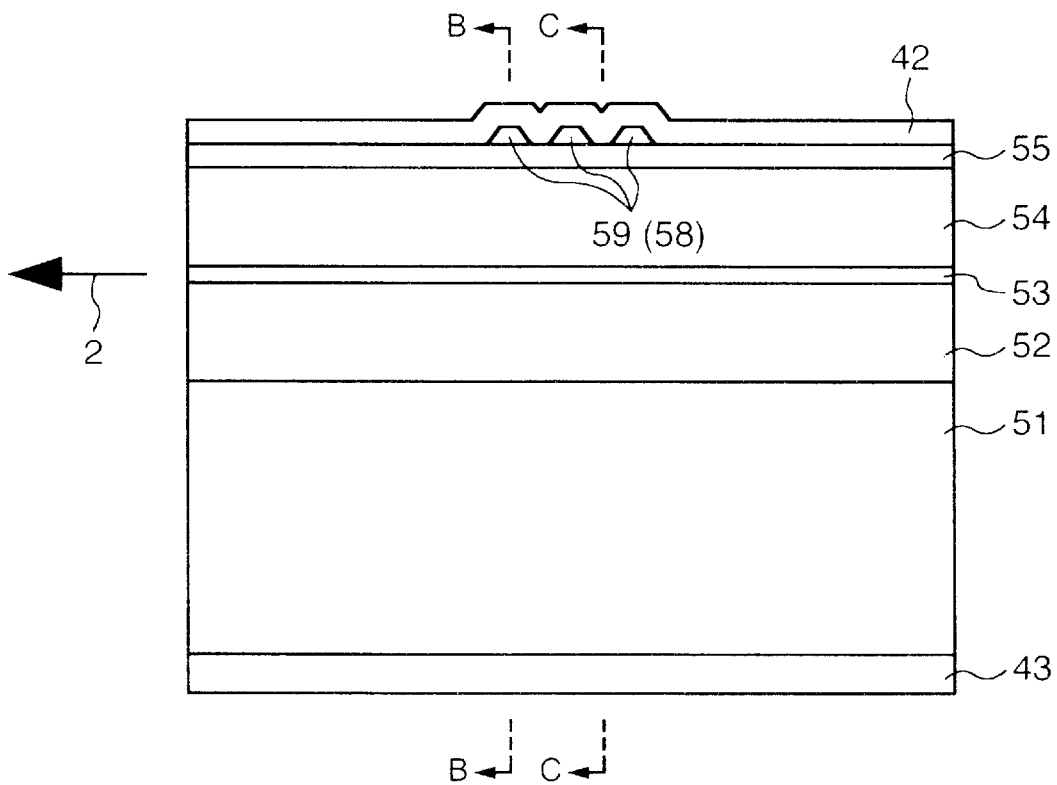
FIG. 12 is a cross-sectional view taken along line A—A in FIG. 11.
Figure 13:
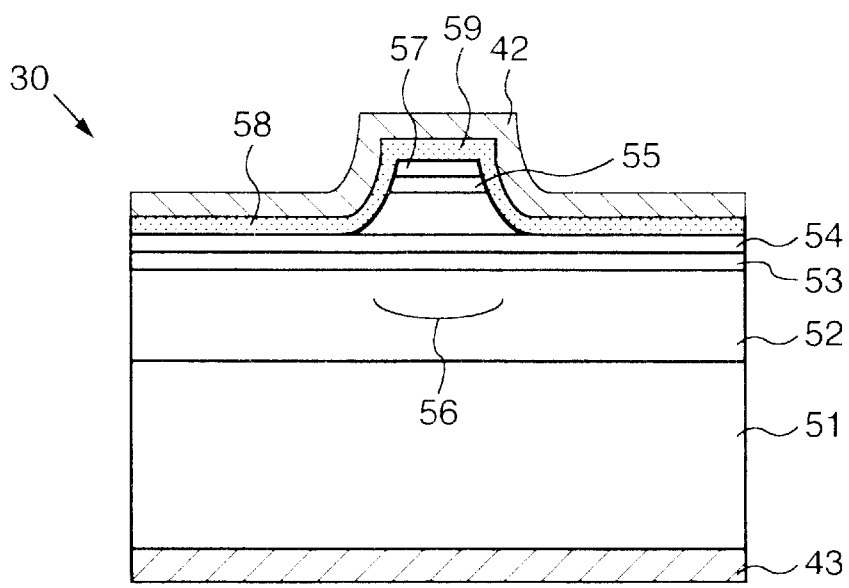
FIG. 13 is a cross-sectional view taken along line B—B in FIG. 12.
Figure 14:
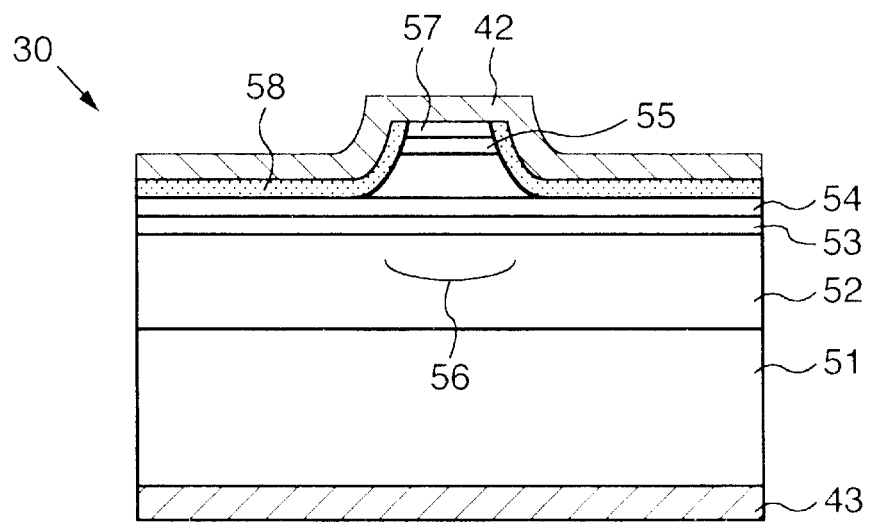
FIG. 14 is a cross-sectional view taken along line C—C in FIG. 12.

FIGS. 11 to 14 shows a semiconductor laser element in accordance with another embodiment (embodiment 2) of the present invention, wherein FIG. 11 is a plan view of the semiconductor laser element, FIG. 12 is a cross-sectional view taken along line A—A in FIG. 11, FIG. 13 is a cross-sectional view taken along line B—B in FIG. 12, and FIG. 14 is a cross-sectional view taken along line C—C in FIG. 12.

The semiconductor laser element 30, as shown in FIGS. 11 to 14, has a rectangular structure wherein a plurality of semiconductor layers are formed on an n type GaAs substrate 51 respectively in the form of a predetermined pattern. A cathode electrode 43 is provided on a lower surface of the structure and reflective films 44 and 45 (refer to FIG. 11) are provided on both light exit surfaces of the laser beam 2 respectively.

As shown in FIGS. 12 to 14, the semiconductor laser element 30 is formed based on an n type GaAs substrate 51. The plane direction of the n type GaAs substrate 51 declines by about 15 degrees from the plane (100) toward the plane (110).

Sequentially formed on the n type GaAs substrate 51 are an n type clad layer 52 of $(Al_{0.7}Ga_{0.3})_{0.5}In_{0.5}P$ having a thickness of 1.8 μm and an impurity (Se) concentration of $1 \times 10^{18}$ cm$^{-3}$, a multi-quantum-well active layer 53, a p type clad layer 54 of $(Al_{0.7}Ga_{0.3})_{0.5}In_{0.5}P$ having a thickness of 1.6 μm and an impurity (Zn) concentration of $7 \times 10^{17}$ cm$^{-3}$, and a p type cap layer 55 of GaAs having a thickness of 0.2 μm and an impurity (Zn) concentration of $1 \times 10^{19}$ cm$^{-3}$. The multi-quantum-well active layer 53 is made up of four $Ga_{0.5}In_{0.5}P$ well layers (having a thickness of 7 nm) and five $(Al_{0.7}Ga_{0.3})_{0.5}In_{0.5}P$ barrier layers (having a thickness of 4 nm)s.

The p type cap layer 55 and p type clad layer 54 form a stripe-like region 56 having a width of about 4 μm along the center of the semiconductor laser element 30. The stripe-like region 56 is formed by sequentially forming the semiconductor layers (p type cap layer 55 as its uppermost layer) on the n type GaAs substrate 51 and then etching the laminated structure down to a residual thickness of about 0.3 μm. Zinc is diffused in a surface layer part of the p type cap layer 55 down to a predetermined depth to form a p$^+$ type GaAs layer 57 as an ohmic contact layer.

When the stripe-like region 56 is formed, a zinc oxide film is formed on the entire upper surface of the flat p type cap layer 55, and then the zinc oxide film is selectively removed (etched). Thereafter the structure is etched with use of the zinc oxide film as a mask until the thickness of the p type clad layer 54 becomes nearly 0.3 μm to form the stripe-like region 56. Next zinc diffusion is carried out with use of the residual zinc oxide film as a diffusion source to form the p$^+$ type GaAs layer 57.

Next, a silicon oxide film 58 is formed on the entire major surface (an upper surface in FIGS. 13 and 14) of the n type GaAs substrate 51, and then the zinc oxide film is etched and removed with use of an hydrochloric-acid system etching solution to remove the silicon oxide film deposited on the zinc oxide film. The silicon oxide film 58 is provided suitably on the p type clad layer 54 from the side of the stripe-like region 56 and as to transverse the stripe-like region 56 as shown in FIGS. 13 and 12. The silicon oxide film 58 transversing the stripe-like region 56 forms a current block region 59. In the present embodiment 2, a plurality of such current block regions are provided in the form of a plurality of parallel elongated steps.

The current block regions 59 are formed to correspond to the intermediate part of the optical waveguide. For example, the current block regions 59 have a length of about 2 μm and an interval between the current block regions 59 is about 4 μm. For example, five or six of such current block regions 59 are provided so that an area where these current block regions 59 are present forms a saturable absorption area (saturable absorber) exhibiting a saturable absorbing characteristic. The saturable absorption area has a length of 30 μm or so.

When a predetermined voltage is applied between the anode and cathode electrodes 42, the semiconductor laser element 30 of the present embodiment 1 emits the laser beam 2 from both ends of the optical waveguide (cavity) of the multi-quantum-well active layer 53 corresponding to the stripe-like region 56. At this time, a current flows from the anode electrode 42 through the p$^+$ type GaAs layer 57, p type cap layer 55, p type clad layer 54, multi-quantum-well active layer 53, n type clad layer 52 and n type GaAs substrate 51 to the cathode electrode 43. However, no current flows through the multi-quantum-well active layer area corresponding to the current block region 59. As a result, there is formed a saturable absorber which exhibit a saturable absorbing characteristic.

As a result, with respect to the light output power versus current characteristic of the semiconductor laser element 30, light is absorbed at the time of a low output as in the embodiment 1 and thus light is absorbed in a range where the light output power versus current characteristic is bent downwardly at the beginning of oscillation. However, when the light intensity exceeds a constant level, the light absorption is saturated and emission of the laser beam starts, thus providing such a light output power versus current characteristic as shown in FIG. 3.

Thereby a state wherein the light output power of the semiconductor laser varies proportionally to the current can be obtained starting with its low output. Partial current injection into the saturable absorption area enables the magnitude of light absorption of the active layer of this area to be smaller than that in the case of no current, whereby not only the allowable range of length of the saturable absorption area can be made longer but also an increase in the operating current caused by the saturable absorption can be suppressed to a small level.

In the present embodiment 2, when the saturable absorption area is set to have a length of 30 μm with respect to 300 μm as the full length of the stripe, a good characteristic can be obtained.

With such a system arrangement as mentioned above, there can be obtained a light output power versus current characteristic which is nearly linear in a light intensity range of from 0.2 mW to 5 mW and therefore good multiple density printing can be realized highly controllably.

Although the present embodiment has been explained in connection with the case where the film including the saturable absorber is provided as the facet reflection film of the edge emission type semiconductor laser, the similar principle of the present invention may be applied even to a Brag reflector provided in a vertical cavity surface emitting laser. Further, the saturable absorber may be made of any substance so long as it has a suitable saturable absorbing characteristic, and thus it is not limited only to amorphous silicon.

Embodiment 3

Figure 15:
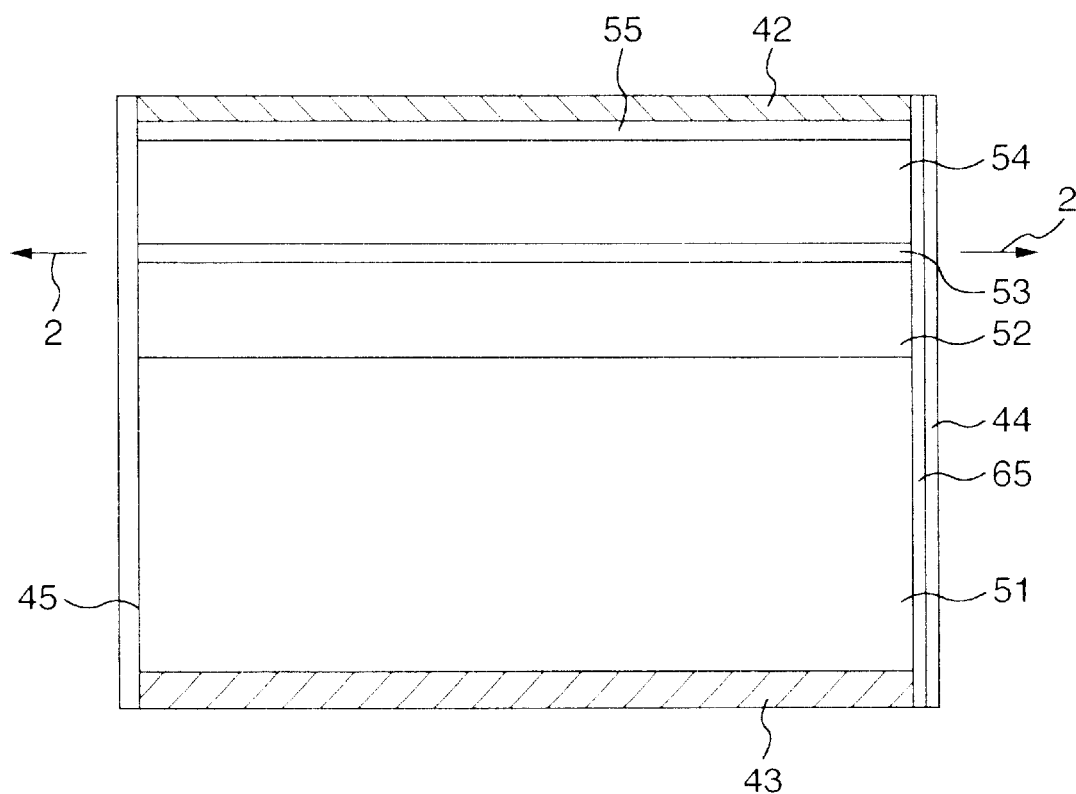
FIG. 15 is a cross-sectional view of a semiconductor laser element in another embodiment (embodiment 3) of the present invention.
Figure 16:
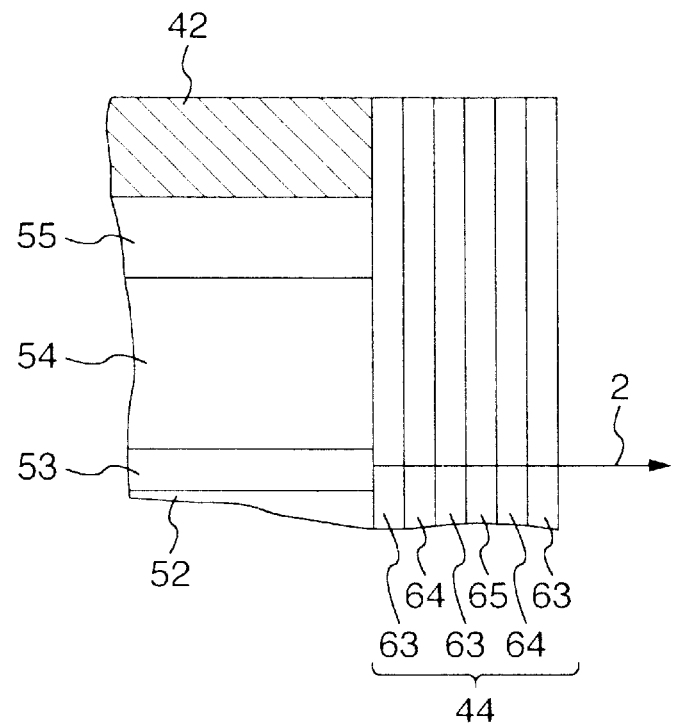
FIG. 16 diagrammatically shows a cross-sectional view of high-reflection films provided in one end of the semiconductor laser element in the present embodiment 3.

FIGS. 15 and 16 shows a semiconductor laser element in accordance with another embodiment (embodiment 3) of the present invention, wherein FIG. 15 is a cross-sectional view of the semiconductor laser element and FIG. 16 diagrammatically shows a high-reflection film provided at one end of the element.

The present embodiment 3 is an example where a saturable absorber is provided at a facet of the optical waveguide of the semiconductor laser. The semiconductor laser element 30 of the present embodiment 3 corresponds to the semiconductor laser element 30 of the foregoing embodiment 2 but the current block region 59 is not provided on the p type cap layer 55, and a thin film layer such as a silicon film 65 as a saturable absorber exhibiting a saturable absorbing characteristic is provided within one 44 of the reflective films 44 and 45 provided on the forward light exit surface.

With respect to the reflective films 44 and 45, it is general to coat the light exit surface with a dielectric film such as a silicon oxide (SiO$_2$) film or silicon nitride (SiN) film which does not absorb a laser beam. In the present embodiment 3, however, as shown in FIGS. 15 and 16, a silicon film 65 of 5 nm in thickness is provided within a dielectric multilayered film of SiN films 63 and SiO$_2$ films 64 to form a saturable absorber having a saturable absorbing characteristic.

Provided as sequentially laminated on the front light exit surface of the semiconductor laser element 30 are a silicon nitride (SiN) film 63, a silicon oxide (SiO$_2$) film 64, an SiN film 63, a silicon layer 65, an SiO$_2$ film 64 and an SiN film 63, as shown in FIG. 16. The SiN film 63 and SiO$_2$ film 64 each is set to have a thickness corresponding to ¼ of the wavelength (λ) of the laser beam 2. The silicon layer 65 may be located at any position so long as it is positioned between the SiN film 63 and SiO$_2$ film 64.

In the present embodiment 3, the reflective film 44 of the front light exit surface is set to have a reflectance of 60–80%, whereas the reflective film 45 of the backward light exit surface including the silicon layer 65 is set to have a reflectance of about 60%.

In the semiconductor laser element 30 of the present embodiment 3, since the silicon layer 65 absorbs light at the time of a low output, light is absorbed in an area having a light output power versus current characteristic bent downwardly at the beginning of oscillation. As the light intensity exceeds a constant level, however, the light absorption is saturated and emission of the laser beam starts and there can be obtained such a light output power versus current characteristic as shown in FIG. 3 as in the foregoing embodiment 1. As a result, a state wherein the light output power of the semiconductor laser varies in proportion to its current, is obtained even from the area of its low output.

With such a system arrangement as mentioned above, a light output power versus current characteristic nearly linear in a light intensity range of from 0.2 mW to 5 mW was able to be obtained and multiple density printing was able to be favorably controlled.

Embodiment 4

Figure 17:
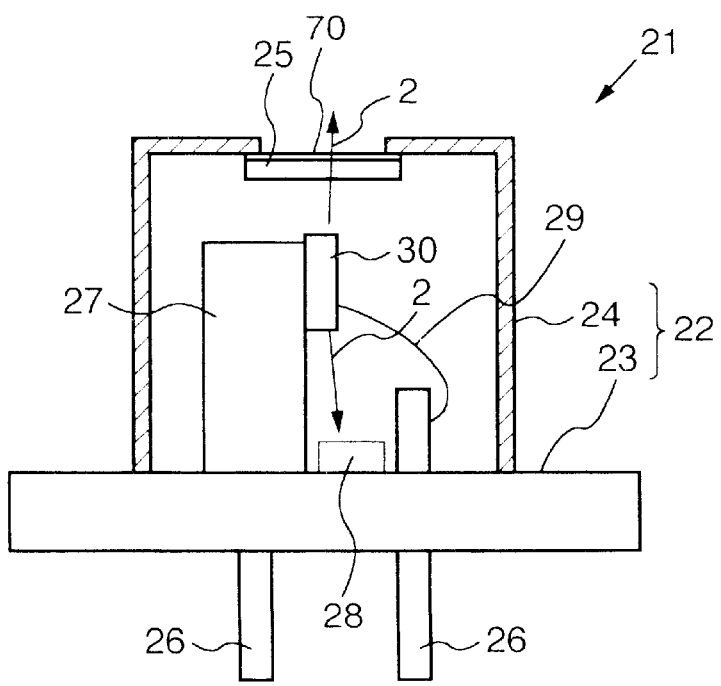
FIG. 17 is a cross-sectional view of a semiconductor laser device in another embodiment (embodiment 4) of the present invention.
Figure 18:
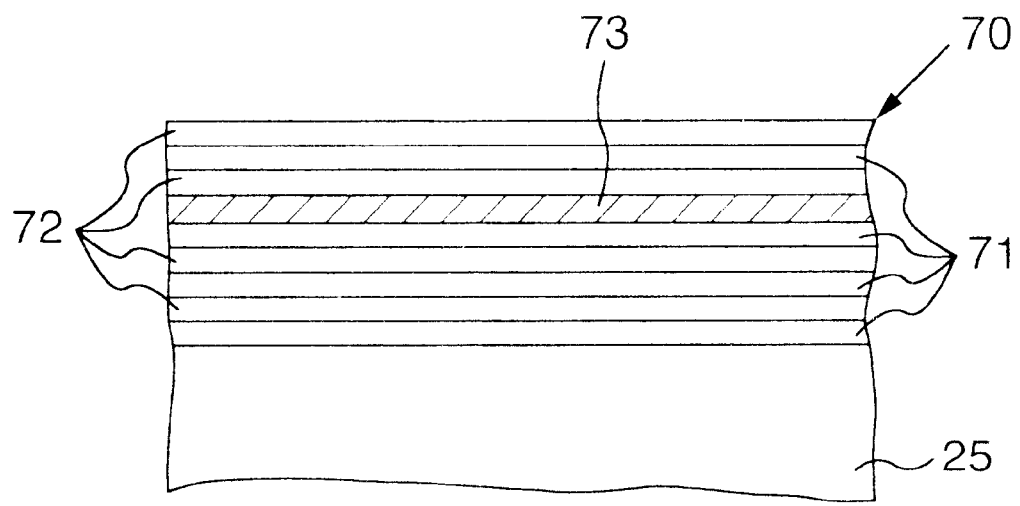
FIG. 18 diagrammatically shows a cross-sectional view of a coating film provided on a optical window facet of the semiconductor laser device in the present embodiment 4.

FIG. 17 and 18 shows a semiconductor laser device in accordance with another embodiment (embodiment 4) of the present invention, wherein FIG. 17 is a cross-sectional view of the semiconductor laser device and FIG. 18 diagrammatically shows coated films provided on the optical window facet of the laser device.

The present embodiment 4 is an example wherein a saturable absorber is formed on an optical window facet of a package having the semiconductor laser with the saturable absorber built therein.

The semiconductor laser device 21 of the present embodiment 4 corresponds to the semiconductor laser device 21 of the foregoing embodiment 1, but a non-reflection coated film structure 70 including a thin film layer as a saturable absorber having a saturable absorbing characteristic is provided on the optical window facet of the cap 24 of the package 22, or in other words, on one surface, e.g., outer surface of the glass plate 25 forming the optical window to improve the linearity of the light output power versus current characteristic. For example, a silicon film 73 may be used as the thin film layer.

In an ordinary semiconductor laser device, it is general to form a non-reflection coated film structure 70 by reflection free coating of the optical window facet of a package with silicon oxide, silicon nitride or the like which does not absorb a laser beam to form dielectric films on the light exit surface, as shown in FIG. 17. In the present embodiment 4, as shown in FIG. 18, a silicon film 73 is formed within the non-reflection coated film structure 70 forming one surface of the glass plate 25. As shown in FIG. 18, four pairs of SiN film 71 and $SiO_2$ film 72 are superimposedly formed on one surface of the glass plate 25, the silicon film 73 having a thickness of 5 nm is disposed between the third SiN film 71 and $SiO_2$ film 72.

Each of the SiN films 71 and $SiO_2$ films 72 is set to have a thickness corresponding to ¼ of the wavelength ($\lambda$) of the laser beam 2. Further, the silicon film 73 may be located at nay position so long as it is positioned between the SiN film 71 and $SiO_2$ film 72.

Since the silicon film 73 of 5 nm in thickness is provided within the dielectric multilayered film structure of the SiN films 71 and $SiO_2$ films 72, a saturable absorbing characteristic can be obtained. Accordingly since the silicon films 73 absorb light at the time of a low output, light is absorbed in a range having a light output power versus current characteristic bent downwardly at the beginning of oscillation. When the light intensity exceeds its constant level, however, the light absorption is saturated, emission of the laser beam starts, and a light output power versus current characteristic similar to that of the foregoing embodiment 1 as shown in FIG. 3 can be obtained. As a result, a state wherein the light output power of the semiconductor laser varies in proportion to its current can be obtained starting with its low output.

With such a system arrangement as mentioned above, a light output power versus current characteristic nearly linear in a light intensity range of from 0.2 mW to 5 mW was able to be obtained and multiple density printing was able to be favorably controlled.

Embodiment 5

Figure 19:
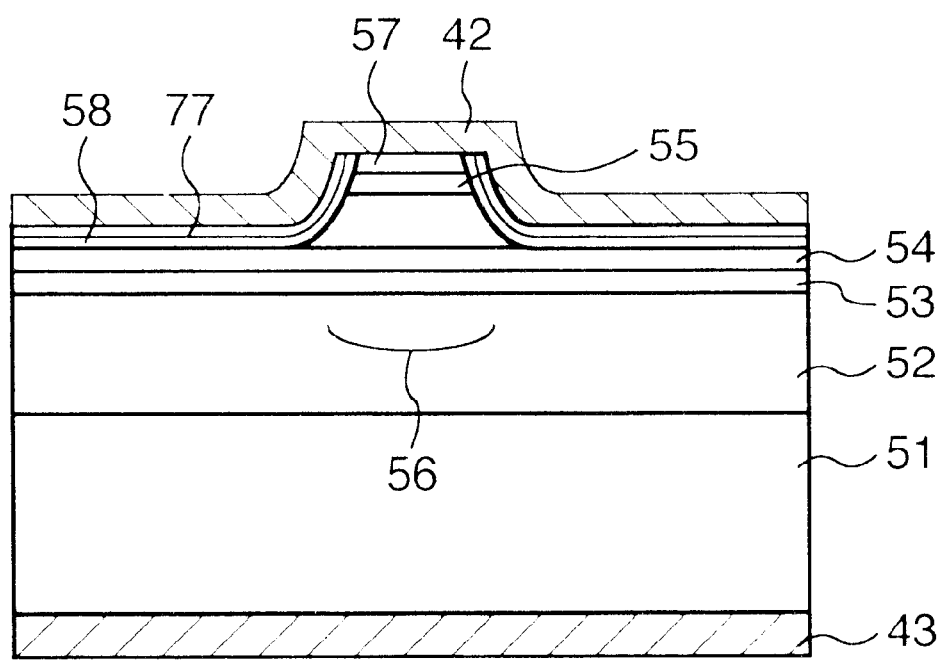
FIG. 19 is a cross-sectional view of a semiconductor laser element in another embodiment (embodiment 5) of the present invention.
Figure 20:
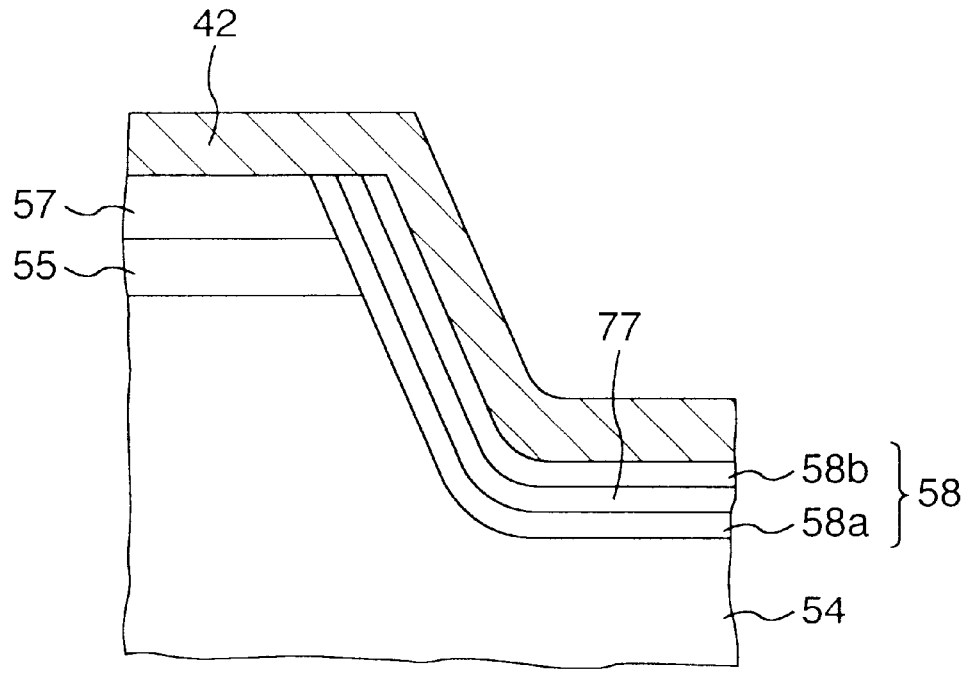
FIG. 20 is a cross-sectional view of a part of the semiconductor laser element of the present embodiment 5.
Figure 21:
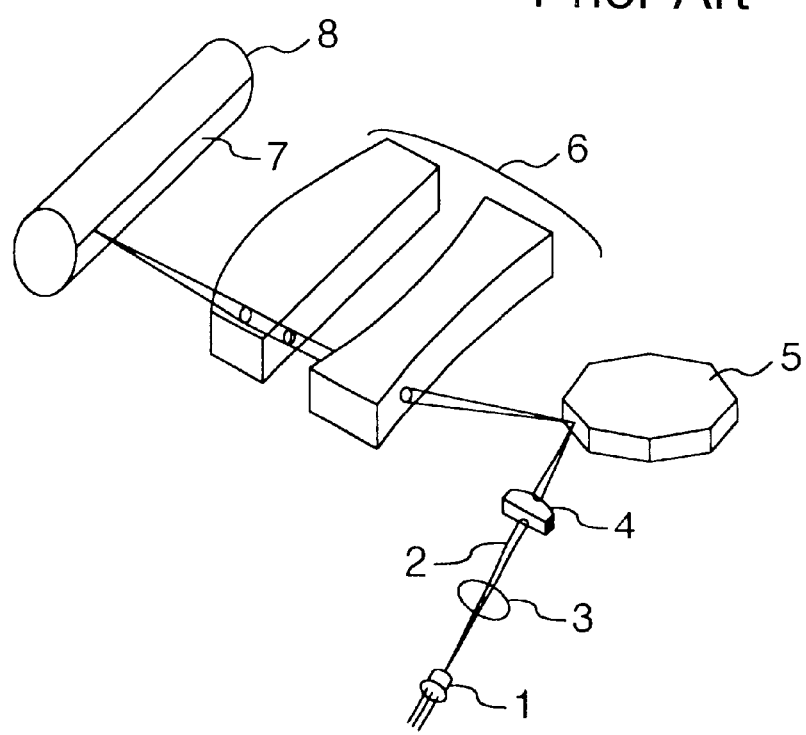
FIG. 21 diagrammatically shows an exposing optical system of a prior art laser printer.

FIGS. 19 and 20 show a semiconductor laser element in accordance with another embodiment (embodiment 5) of the present invention, wherein FIG. 19 is a cross-sectional view of the semiconductor laser element and FIG. 20 is a cross-sectional view of a part of the element.

The present embodiment 5 shows an example wherein a saturable absorber is formed within an insulating layer below an electrode away from the optical waveguide structure of the semiconductor laser element.

The semiconductor laser element 30 of the present embodiment 5 corresponds to the semiconductor laser element 30 of the foregoing embodiment 2, but the current block region 59 is not provided on the p type cap layer 55. Layers 52–54 are semiconductor layers. And as shown in FIGS. 19 and 20, An amorphous silicon film 77 as a saturable absorber exhibiting a saturable absorbing characteristic is provided within a silicon oxide film 58 provided as contacted with the p type clad layer 54 and p type cap layer 55 except for those located above the stripe-like region (part) 56. That is, as shown in FIG. 20, a silicon oxide film 58a is provided as contacted with the p type clad layer 54 and p type cap layer 55, the amorphous silicon film 77 is formed on the silicon oxide film 58a, and then a silicon oxide film 58b is provided on the amorphous silicon film 77.

In the present embodiment 5, a forbidden band was able to be controlled in a range of 1.6 eV to 2.0 eV depending on the amount of hydrogen or nitrogen atoms contained in the amorphous silicon and to be designed so as to have a light absorption coefficient to a laser beam having a wavelength of 700 nm or less. Further, the embodiment was able to be designed so that inactivation of recombination centers in the amorphous silicon causes saturation of light absorption with relatively less light. In addition, since the insulator film was made in the form of multiple layers, this caused a stress generated in the insulator film to be lightened, which also contributed to an improvement in the reliability of the semiconductor laser.

Therefore, in the semiconductor laser element 30 of the present embodiment, as in the foregoing respective embodiments, light is absorbed in a range having a light output power versus current characteristic bent downwardly at the beginning of oscillation, but as the light intensity exceeds its constant level, the light absorption is saturated, emission of a laser beam starts, and such a light output power versus current characteristic as shown in FIG. 3 can be obtained. As a result, a state wherein the light output power of the semiconductor laser varies proportionally with its current can be obtained even from the area of its low output.

With such a system arrangement as mentioned above, a light output power versus current characteristic nearly linear in a light intensity of from 0.2 mW to 5 mW was able to be obtained and good control of multiple density printing can be realized.

Although the present invention made by the present inventor has been detailed in connection with the embodiments, it goes without saying that the invention may be modified in various ways without departing from the spirit and scope thereof. That is, in the present invention, the saturable absorber may be provided, in principle, at nay position in the optical path. However, for the purpose of providing light absorption with a sufficiently weak light intensity, it is usually preferable to position the saturable absorber in the optical path at such a position that the density of the laser beam is highest.

Explanation has been made in the foregoing in connection with the case where the invention made by the present inventor is applied to the laser printer technique belonging to its application field. However, the present invention is not limited to the specific example but also can be applied, e.g., to an electrophtography and so on.

The present invention can be applied to such a technique that a light output power versus current characteristic at least ranging from a low optical power range to a high optical power range must be linear.

Typical ones of effects of the invention disclosed therein are summarized as follows.

(1) In the multiple density printing technique of the multiple stage type requiring variations of exposing intensity down to a low intensity level, a good light output power versus current characteristic down to the low light intensity can be realized and control of the multiple density printing of the multiple stage type can be easily achieved.

(2) In the multiple density printing of the light intensity modulation type, the light output power characteristic of the laser beam at the focusing position on the photo-conductor drum can exhibit its linearity even in its low optical power range as in the other light output power range, thus realizing fine multiple density printing.

(3) Since the size of the printing dot to be formed on the photo-conductor drum based on the light intensity modulation method can be regularly changed arithmetically even in the low optical power range, fine multiple density printing can be realized.

What is claimed is:

1. An electric photograph system comprising:
   a semiconductor laser;
   a photo-conductor drum rotatably controlled by an exposing optical system, a laser beam emitted from said semiconductor laser being focused and scanned on a surface of said photo-conductor drum, a light output power of said semiconductor laser being controlled to form printing dots of different sizes on said photoconductor drum and to form an electric potential image for multiple density printing; and
   correction means for saturably absorbing said laser beam with intensity exceeding a constant level so as to correct a light output power of 0.2 to 5 mw versus driving current characteristic working range of said semiconductor laser to be linear.

2. An electric photograph system according to claim 1, wherein said saturable absorber is provided in the semiconductor laser near a passage of said laser beam.

3. An electric photograph system according to claim 2, wherein a driving current of the semiconductor laser with the saturable absorber incorporated therein is arithmetically changed to generate printing dots having arithmetically changed sizes, and said printing dots form an electric potential image on said photo-conductor drum for fine multiple density printing.

4. An electric photograph system according to claim 1, wherein said saturable absorber is provided in an optical waveguide structure of a semiconductor laser element forming said semiconductor laser.

5. An electric photograph system according to claim 4, wherein said saturable absorber is made in the form of a non current injected area formed in a part of said optical waveguide structure of said semiconductor laser element.

6. An electric photograph system according to claim 5, wherein said saturable absorber is made in a part of the optical waveguide structure of said semiconductor laser element with a lower driving current injection density than at least another part of the optical waveguide structure.

7. An electric photograph system according to claim 6, wherein said saturable absorber includes a plurality of non current injected areas placed among a plurality of current injected areas.

8. An electric photograph system according claim 7, wherein to a driving current of the semiconductor laser with the saturable absorber incorporated therein is arithmetically changed to generate printing dots having arithmetically changed sizes, and said printing dots form an electric potential image on said photo-conductor drum for fine multiple density printing.

9. An electric photograph system according to claim 4, wherein a driving current of the semiconductor laser with the saturable absorber incorporated therein is arithmetically changed to generate printing dots having arithmetically changed sizes, and said printing dots form an electric potential image on said photo-conductor drum for fine multiple density printing.

10. An electric photograph system according to claim 5, wherein a driving current of the semiconductor laser with the saturable absorber incorporated therein is arithmetically changed to generate printing dots having arithmetically changed sizes, and said printing dots form an electric potential image on said photo-conductor drum for fine multiple density printing.

11. An electric photograph system according to claim 6, wherein a driving current of the semiconductor laser with the saturable absorber incorporated therein is arithmetically changed to generate printing dots having arithmetically changed sizes, and said printing dots form an electric potential image on said photo-conductor drum for fine multiple density printing.

12. An electric photograph system according to claim 1, wherein said saturable absorber is provided on a facet of an optical waveguide of said semiconductor laser.

13. An electric photograph system according to claim 12, wherein said saturable absorber is made in the form of a thin film layer formed as laminated on a reflection film formed on the facet of the optical waveguide of said semiconductor layer.

14. An electric photograph system according to claim 13, wherein a current ranging from a low optical power range to a high optical power range is arithmetically changed to generate printing dots having arithmetically changed sizes, said printing dots forming an electric potential image on said photo-conductor drum for fine multiple density printing.

15. An electric photograph system according to claim 12, wherein a current ranging from a low optical power range to a high optical power range is arithmetically changed to generate printing dots having arithmetically changed sizes, said printing dots forming an electric potential image on said photo-conductor drum for fine multiple density printing.

16. An electric photograph system according to claim 1, wherein said saturable absorber is provided on a optical window facet for transmission of said laser beam in a semiconductor laser device having said semiconductor laser built therein.

17. An electric photograph system according to claim 16, wherein a current ranging from a low optical power range to a high optical power range is arithmetically changed to generate printing dots having arithmetically changed sizes, said printing dots forming an electric potential image on said photo-conductor drum for fine multiple density printing.

18. An electric photograph system according to claim 1, wherein a driving current of the semiconductor laser with the saturable absorber incorporated therein is arithmetically changed to generate printing dots having arithmetically changed sizes, and said printing dots form an electric potential image on said photo-conductor drum for fine multiple density printing.

19. An electric photograph system according to claim 1, wherein said saturable absorber is 8–15 μm long.

20. An electric photograph system according to claim 1, wherein a current blocking layer which defines a length of the saturable absorber is 1.8 μm thick.

21. An electric photograph system comprising:

a semiconductor laser comprising:

a semiconductor layer of a first conductivity type provided with a stripe part defining an optical waveguide structure;

an insulator layer formed on said semiconductor layer of the first conductivity type other than said stripe part, said insulator layer being made of a first silicon oxide film provided on said semiconductor layer of the first conductivity type, an amorphous silicon film provided on said first silicon oxide film, and a second silicon oxide film formed on said amorphous silicon film; and an electrode formed on said insulator layer and said stripe part to be electrically connected directly to said semiconductor layer of the first conductivity type directly or indirectly via one or a plurality of other semiconductor layers of the first conductivity type; and a photo-conductor drum rotatably controlled by an exposing optical system, a laser beam emitted from said semiconductor laser being focused and scanned on a surface of said photo-conductor drum, a light output power of said semiconductor laser being controlled to form printing dots of different sizes on said photoconductor drum and to form an electric potential image for multiple density printing, wherein said amorphous silicon film forms correction means for saturably absorbing said laser beam with intensity exceeding a constant level so as to correct a light output power of 0.2 to 5 mw versus driving current characteristic working range of said semiconductor laser to be linear.

22. An electric photograph system according to claim 21, wherein a current ranging from a low optical power range to a high optical power range is arithmetically changed to generate printing dots having arithmetically changed sizes, said printing dots forming an electric potential image on said photo-conductor drum for fine multiple density printing.

* * * * *